United States Patent [19]

Kobayashi et al.

[11] Patent Number: 4,829,368
[45] Date of Patent: May 9, 1989

[54] SOLID COLOR PICKUP APPARATUS

[75] Inventors: Kiyotaka Kobayashi; Makoto Shizukuishi; Masatoshi Tabei, all of Kanagawa, Japan

[73] Assignee: Fuji Photo Film Co., Ltd., Kanagawa, Japan

[21] Appl. No.: 35,402

[22] Filed: Apr. 7, 1987

[30] Foreign Application Priority Data

| Apr. 7, 1986 | [JP] | Japan | 61-78308 |
| Apr. 18, 1986 | [JP] | Japan | 61-89505 |
| May 27, 1986 | [JP] | Japan | 61-120181 |
| Jun. 6, 1986 | [JP] | Japan | 61-130341 |
| Jun. 17, 1986 | [JP] | Japan | 61-139144 |
| Jul. 9, 1986 | [JP] | Japan | 61-159544 |
| Jul. 15, 1986 | [JP] | Japan | 61-164716 |
| Jul. 17, 1986 | [JP] | Japan | 61-166792 |
| Aug. 21, 1986 | [JP] | Japan | 61-194074 |
| Aug. 26, 1986 | [JP] | Japan | 61-198257 |
| Sep. 16, 1986 | [JP] | Japan | 61-215975 |
| Sep. 16, 1986 | [JP] | Japan | 61-215976 |
| Sep. 18, 1986 | [JP] | Japan | 61-218214 |
| Sep. 22, 1986 | [JP] | Japan | 61-222209 |

[51] Int. Cl.$^4$ .............. H04N 9/04; H04N 9/07
[52] U.S. Cl. .................. 358/41; 358/213.23; 358/213.26; 358/213.29; 358/44
[58] Field of Search ........... 358/41, 43, 44, 213.23, 358/213.26, 213.28, 213.29

[56] References Cited

U.S. PATENT DOCUMENTS

| 4,081,841 | 3/1978 | Ochi et al. | 358/213.26 |
| 4,486,783 | 12/1984 | Tanaka et al. | 358/213.29 X |
| 4,500,915 | 2/1985 | Koike et al. | 358/44 |
| 4,539,597 | 9/1985 | Kinoshita et al. | 358/213.28 |
| 4,577,233 | 3/1986 | Kimata | 358/213.29 X |
| 4,581,539 | 4/1986 | Kimata | 358/213.29 X |
| 4,581,652 | 4/1986 | Kinoshita et al. | 358/213.26 |
| 4,584,609 | 4/1986 | Klein et al. | 358/213.26 X |
| 4,597,013 | 6/1986 | Matsumoto | 358/41 X |
| 4,607,287 | 8/1986 | Endo et al. | 358/213.23 X |
| 4,707,735 | 11/1987 | Busby | 358/213.26 X |

FOREIGN PATENT DOCUMENTS

| 0132075 | 1/1985 | European Pat. Off. | 358/43 |
| 3119032 | 3/1982 | Fed. Rep. of Germany | 358/43 |
| 53-77131 | 7/1978 | Japan | 358/44 |
| 53-83424 | 7/1978 | Japan | 358/44 |
| 53-83425 | 7/1978 | Japan | 358/44 |
| 54-10626 | 1/1979 | Japan | 358/43 |

OTHER PUBLICATIONS

Lou Garner, "State of Solid State", Radio Electronics, Aug. 1973, pp. 55–58.
W. Steffe et al.; "A High Performance 190×244 CCD Area Image Sensor Array", Oct. 1975, pp. 101–108.

Primary Examiner—James J. Groody
Assistant Examiner—E. Anne Faris
Attorney, Agent, or Firm—Sughrue, Mion, Zinn, Macpeak & Seas

[57] ABSTRACT

A solid pickup apparatus comprises a photo sensitive portion comprising photosensitive means and photosensitive transfer means for receiving a light including image information and generating respectively first signal charges and second signal charges therein corresponding to the image informations, the photosensitive transfer means mutually transferring the first and second signal charges, gate means for controlling the flow of said first signal charges of said photosensitive means to said photosensitive transfer means under transfer device control, drive control means for controlling the transference of the first and second signal charges in said photosensitive transfer means, and color filters covering the photosensitive portion. An electronic still camera comprises a solid pickup element having color filters for picking up an image of an object to generate color image signals in facial sequence, recording means for recording the color image signals in recording areas corresponding to the respective color image signals in accordance with the facial sequence, and playback means for simultaneously playing back color image signals recorded in the respective recording areas of the recording means.

26 Claims, 25 Drawing Sheets

FIG. 27
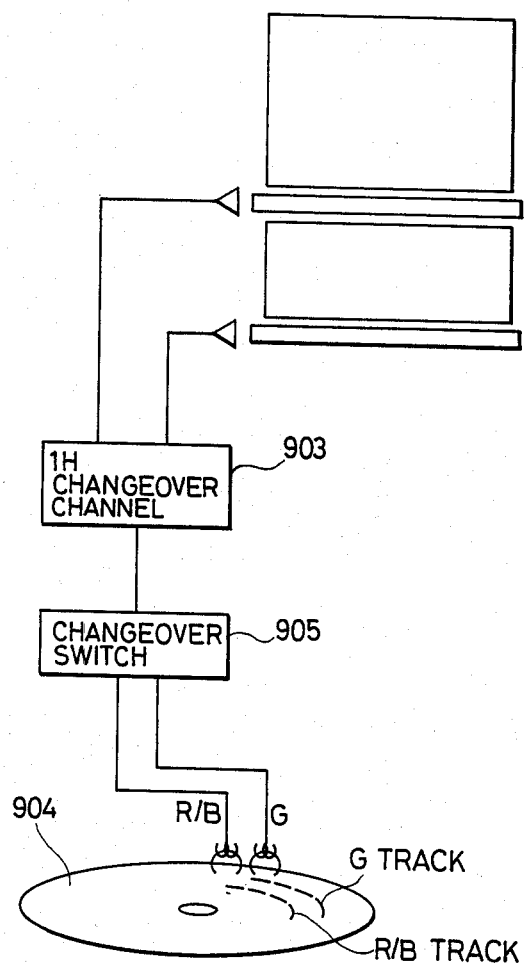
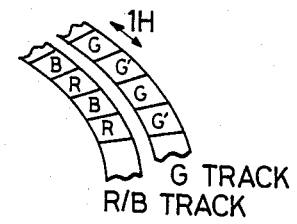

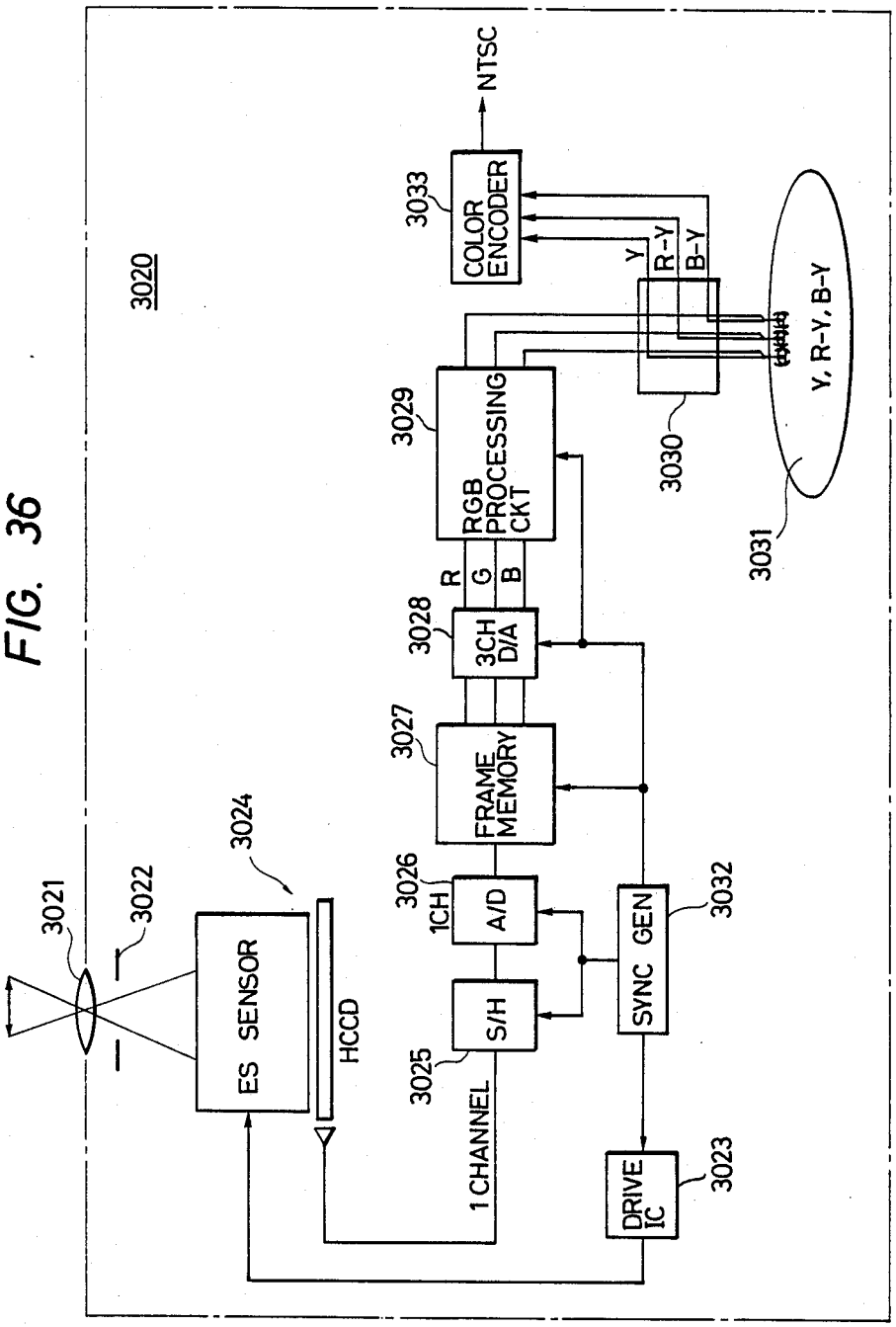

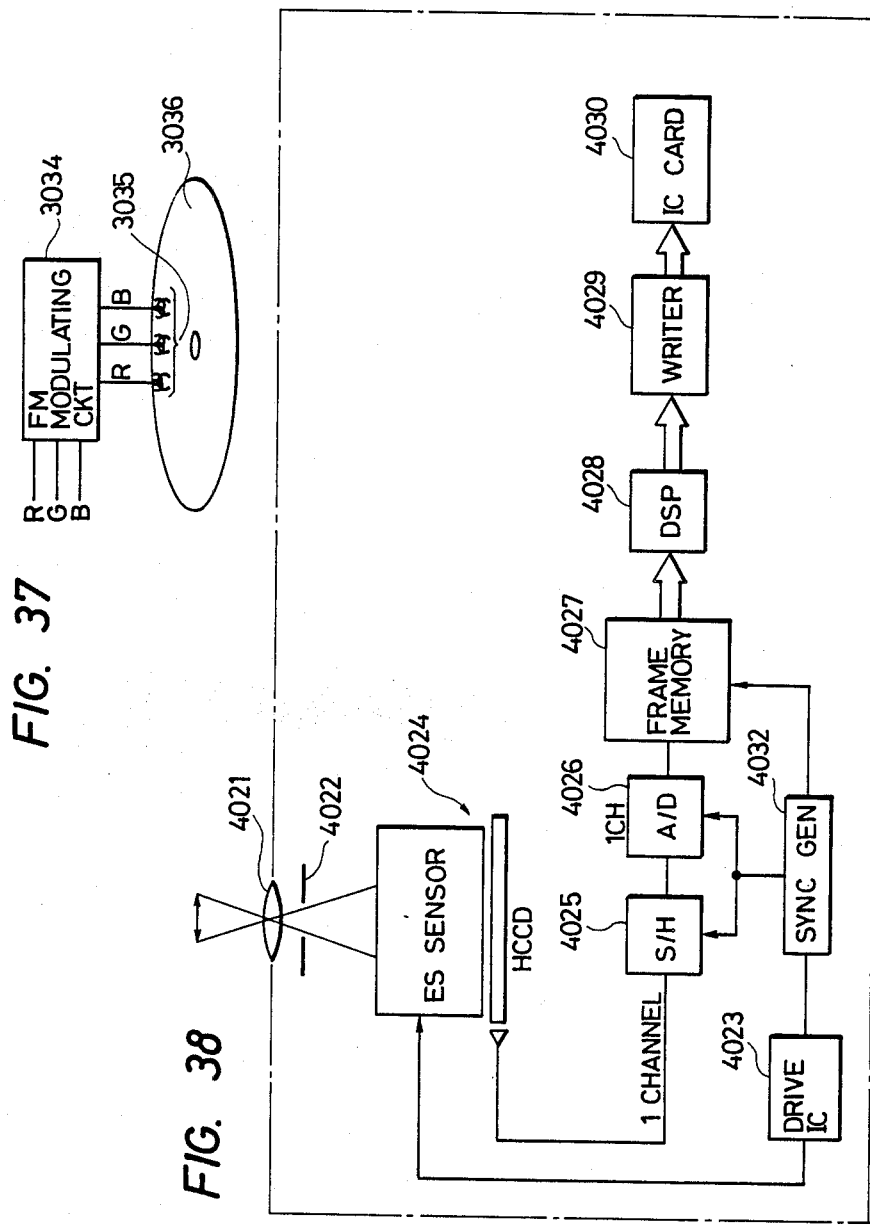

SOLID COLOR PICKUP APPARATUS

BACKGROUND OF THE INVENTION

1. Field of the Invention

The present invention relates to a solid pickup apparatus with an improved arrangement of light receiving and transfer means.

2. Prior Art

Conventional known solid pickup apparatus includes those of frame transfer and interline types.

As shown in FIG. 1, the former is composed of a photosensitive portion 1 and a charge storage portion 2 provided separately from the photosensitive portion 1. In the photosensitive portion 1, there are horizontally arranged a plurality of photosensitive blocks $a_1-a_n$ formed with self-scanning type pickup elements performing photosensitive storage and transfer operation, each of the photosensitive blocks $a_1-a_n$ being covered with a striped color filter. On the other hand, the charge storage portion 2 comprises CCD shift registers $b_1-b_n$ formed adjacently to the photosensitive blocks $a_1-a_n$ and covered with an aluminum film or the like for shading. Moreover, a read shift register 3 formed of a horizontal CCD shift register is connected to the one end of each of the CCD shift registers $b_1-b_n$.

The signal charge generated in the photosensitive portion 1 is controlled by a predetermined transfer drive signal and transferred to the charge storage portion 2. The signal charges equivalent to one image derived from the photosensitive portion 1 are temporarily stored in the charge storage portion 2 and the signal charges equivalent to one line are sequentially outputted through the read shift register 3 to an output terminal 4.

In the case of the solid interline type pickup apparatus shown in FIG. 2, there are provided a plurality of light receiving elements 5 separated from each other, each light receiving element 5 being composed of a photodiode and so on whose surface is covered with a given color filter. The signal charge generated in each light receiving element 5 is transferred to a transfer shift register 7 through a transfer gate 6 and then the signal charges equivalent to one line are sequentially transferred to a read shift register 8 by the transfer shift register 7. The signal charges thus transferred are sequentially outputted through a read shift register 8 comprising a horizontal CCD shift register, whereby the signal charges equivalent to one image are outputted to an output terminal 9.

In that case, the surface of each transfer shift register 7 is shaded by an aluminum film to prevent any noise component derived from external light from mixing with the signal charge.

In the frame transfer type solid pickup apparatus, the photosensitive portion 1 functions as an accumulator for accumulating the signals resulting from photoelectric conversion and a transferer for transferring the mass of the signal charge thus accumulated to the charge storage portion 2. In consequence, the effective accumulating time required for the accumulation of the signal charge cannot be increased and therefore it is difficult to improve the sensitivity. Moreover, since the photosensitive portion is covered with polysilicon for use as a transfer electrode, short wavelength light is particularly prevented from passing therethrough and thereby the sensitivity is restricted.

In the case of the interline type, on the other hand, the presence of the shaded transfer shift register in the light receiving means also makes it difficult to improve light storage efficiency and further the shaded portion causes horizontal resolution to reduce.

SUMMARY OF THE INVENTION

The present invention is intended to solve the aforesaid problems and it is therefore an object of the invention to provide a solid pickup apparatus offering improved sensitivity and resolution.

In order to accomplish the aforesaid object, the solid pickup apparatus according to the present invention comprises photosensitive blocks, each of which consists of a plurality of light receiving elements functioning as a photoelectric converter arranged in a predetermined direction and photosensitive transfer blocks, each of which consists of a plurality of photosensitive transfer elements functioning as a photoelectric converter and a transferer to mutually transfer the signal charge under predetermined transfer drive control and is arranged so as to confront each light receiving element through a transfer gate. Accordingly, in this invention, improvement in not only its sensitivity but also resolution has been accomplished since the number of light receivable elements is increased and the light receivable portion is enlarged as described above.

BRIEF DESCRIPTION OF THE DRAWINGS

FIGS. 26(a)-(c) and 27 are diagrams illustrating the progress of process according to the present invention.

FIG. 36 is a block diagram of an electronic still camera as a fourteenth embodiment of the present invention.

FIG. 37 is a modifier embodiment of the present invention.

FIG. 38 is a block diagram of an electronic still camera as a fifteenth embodiment of the present invention.

DETAILED DESCRIPTION OF THE INVENTION

Figure 1:
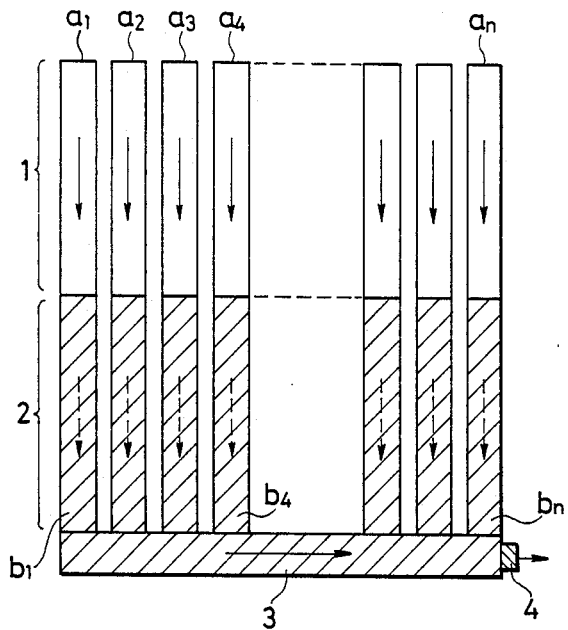
FIGS. 1 and 2 represent a schematic structural view of a conventional solid pickup apparatus.
Figure 2:
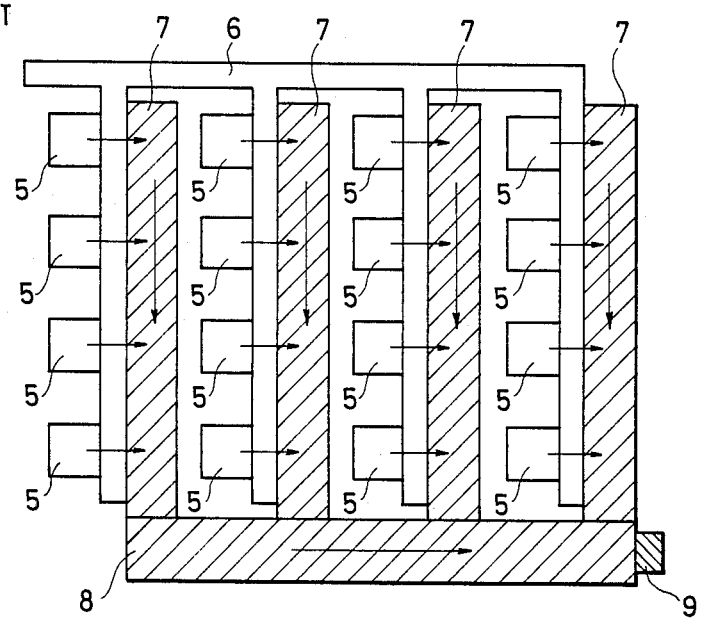
Figure 3:
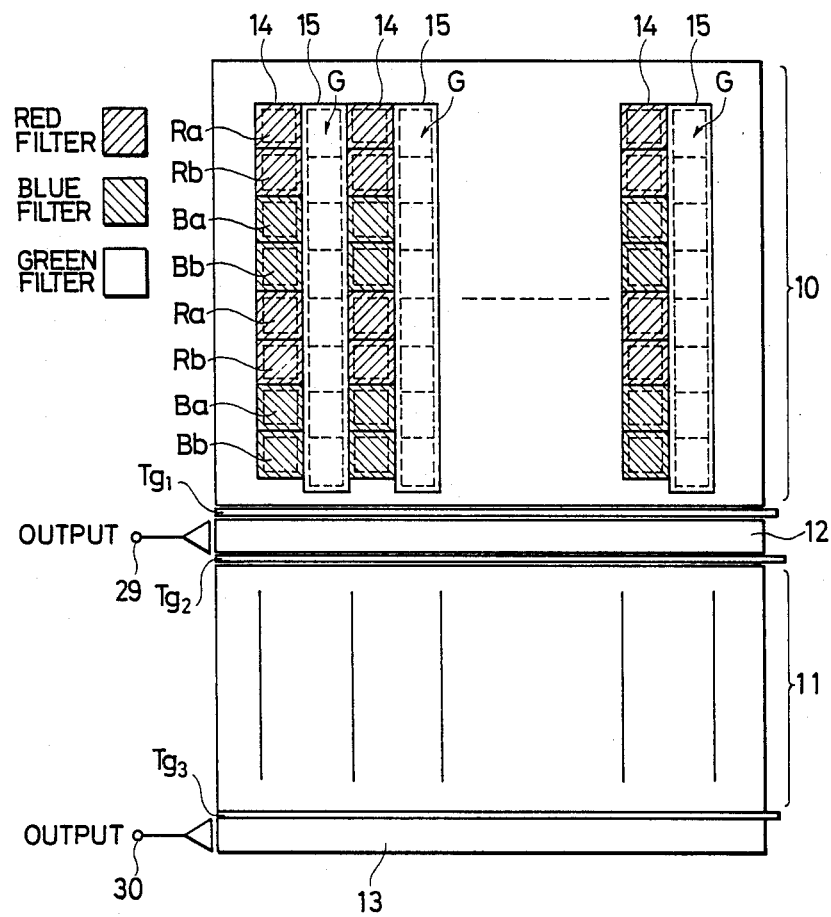
FIG. 3 represents a schematic structural view of a first solid pickup apparatus embodying the present invention.

FIG. 3 is a schematic structural view of a solid pickup apparatus of a first embodiment of the present invention, wherein the solid pickup apparatus comprises a photosensitive portion 10, a charge storage portion 11, a first horizontal charge transfer means 12 and a second horizontal charge transfer means 13, each of the last two means being shown simply in the form of a block.

The photosensitive portion 10 shown in FIG. 3 is composed of photosensitive blocks 14, each consisting of a group of light receiving elements which are photoelectric conversion elements such as photodiodes arranged vertically as shown by a square dotted line and photosensitive (vertical) transfer blocks 15, each of which is arranged side by side with each group. A plurality of photosensitive blocks 14 and that of photosensitive transfer blocks 15 are arranged alternately in the horizontal direction (left to right in FIG. 3).

With the two light receiving elements in the vertical direction as a pair, the pairs of light receiving elements are covered alternately with red filters Ra, Rb and blue filters Ba, Bb wherein the vertical direction means a direction perpendicular to the aforesaid horizontal direction in the photosensitive block 14.

The photosensitive transfer block 15 shown by the square dotted line of FIG. 3 is composed of photosensitive transfer elements arranged vertically so that each of them is adapted to correspond to each light receiving element. Each photosensitive transfer element is a CCD (Charge Coupled Device) exercising a photoelectric effect and functioning as a transferer for transferring the signal charge to the charge storage portion 11 through mutual signal transfer operation. That is, the photosensitive transfer block 15 is composed of self-scanning type pickup devices functioning as a photosensitive storage device and a transfer device.

The surface of the photosensitive transfer block 15 is covered with a striped green filter G.

In the charge storage portion 11, there are formed horizontally-arranged CCD shift registers equivalent in number to the photosensitive transfer blocks 15, so that the signal charge from a particular transfer block 15 is stored in a particular CCD shift register.

Between the photosensitive portion 10 and the charge storage 11 is arranged a first horizontal charge transfer means 12, which is a horizontal CCD shift register for horizontally transferring the signal charge and both sides of the first horizontal charge transfer means 12 are connected with the photosensitive portion 10 and the charge storage portion 11 through transfer gates $Tg_1$, $Tg_2$, respectively.

The other end of the charge storage portion 11 is connected with the side of a second horizontal charge transfer means 13 through a transfer gate $Tg_3$, the second horizontal charge transfer means 13 being formed with a horizontal CCD shift register for horizontally transferring the signal charge.

Figure 4:
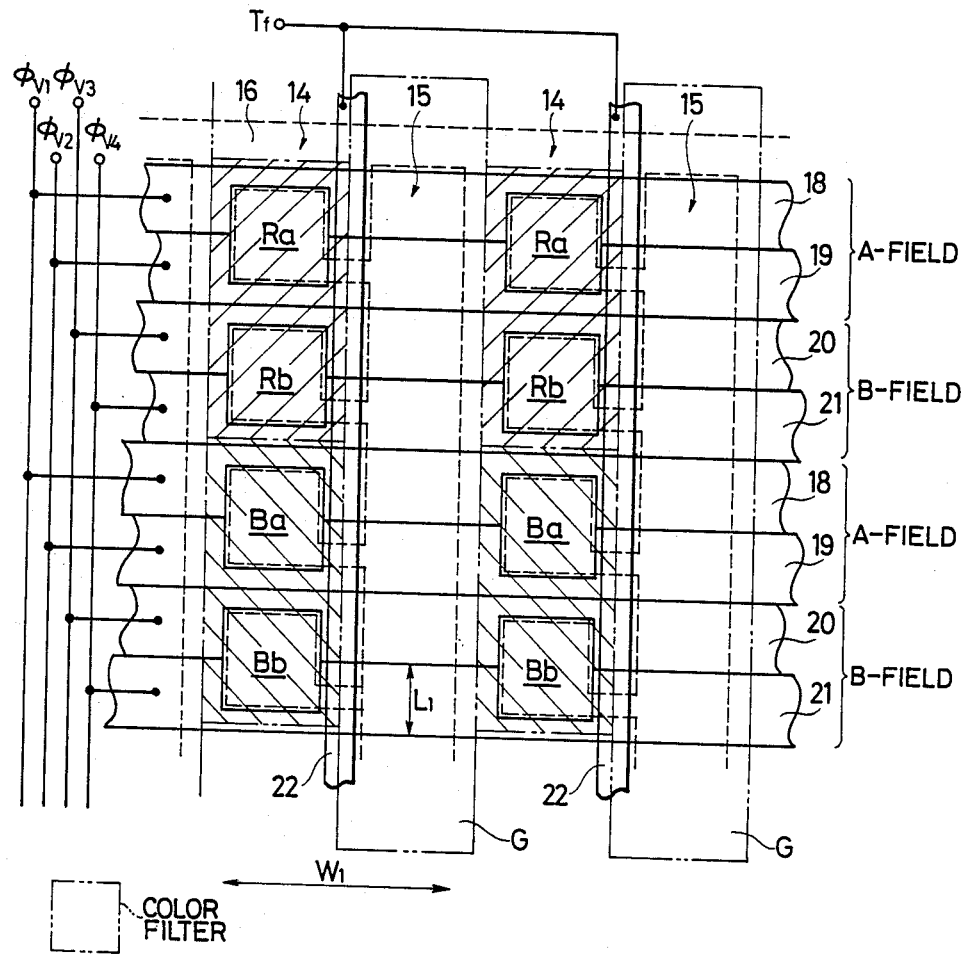
FIG. 4 shows the structure of the principal part of the surface of the photosensitive zone of FIG. 3.

Referring now to FIG. 4, the structure of the photosensitive portion 10 will subsequently be described. The block enclosed by a dotted line is a channel stopper 16 formed on a silicon substrate and the light receiving elements of the photosensitive block 14 are formed in the portion enclosed by the channel stopper 16. The light receiving elements are covered alternately with the red filters Ra, Rb and blue filters Ba, Bb.

The photosensitive transfer block 15 enclosed by the channel stopper 16 and covered with the green filter G is formed between the photosensitive blocks 14. In other words, transfer electrodes 18, 19, 20, 21 of polysilicon layers horizontally extended are alternately formed in the vertical direction and the channel portions located in the lower portions of the transfer electrodes 18, 19, 20, 21 conform to the aforesaid photosensitive transfer elements. The portion corresponding to the horizontal direction of the transfer electrodes 18, 19 is called a field A, whereas the portion corresponding to the horizontal direction of the transfer electrodes 20, 21 is called a field B, whereby interlace scanning for use in televisions as will be described later can be implemented. That is, the relation of the light receiving element of the photosensitive block 14 to the color filter is such that one pitch of the color filter is assigned to a pair of the two light receiving elements in the vertical direction, whereas one pitch of the filter is assigned to each of one light receiving element and one photosensitive transfer element of the photosensitive transfer block 15 in the horizontal direction. More specifically, the elements covered with the filters Ra, Ba of the red and blue filters, and the green filters G corresponding to the filters Ra, Ba are caused to deal with the field A, whereas the elements covered with the filters Rb, Bb of the red and blue filters, and the green filters G corresponding to the filters Ra, Ba are caused to deal with the field B.

A transfer gate 22 for controlling the transfer of the signal charge generated in each light receiving element to the photosensitive transfer block 15 is installed in a part of the channel stopper 16 for separating the photosensitive block 14 from the photosensitive transfer block 15.

The polysilicon layers forming the transfer electrodes 18, 19, 20, 21 are overlapped so as to prevent their mutually disjunctive portions from conducting and are also provided with a recess in order not to cover the light receiving elements of the photosensitive block 14.

Figure 5:
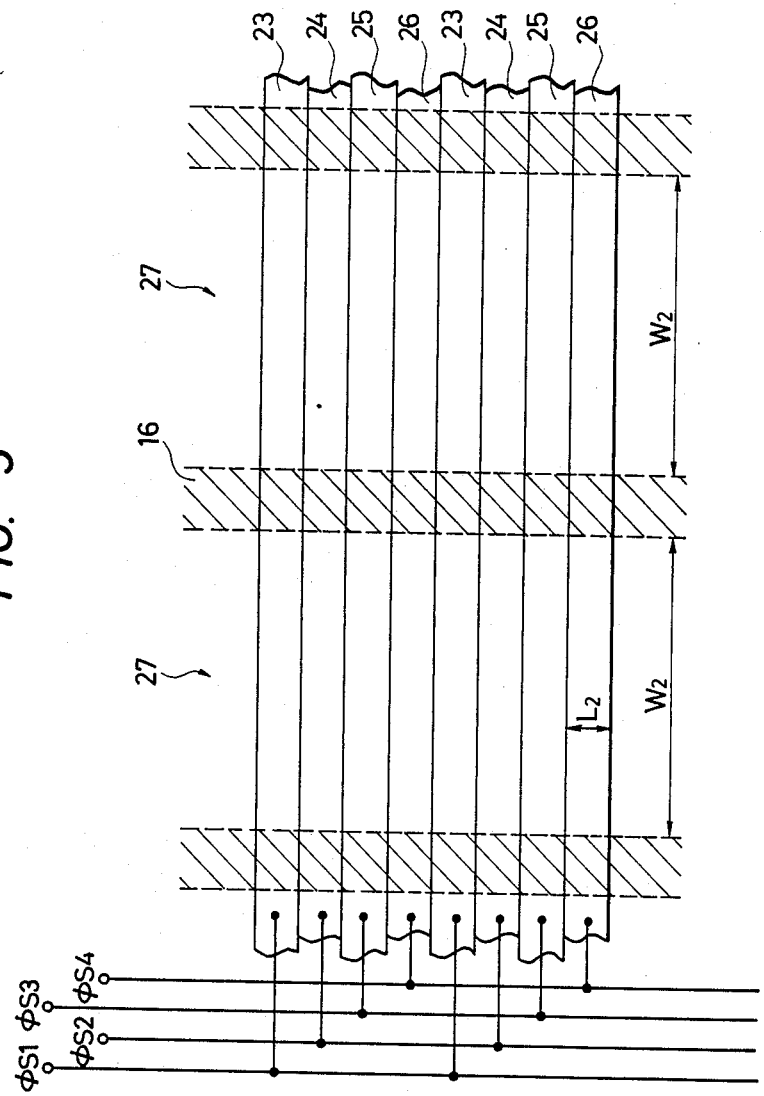
FIG. 5 shows the structure of the principal part of the surface of the charge storage zone of FIG. 3.

FIG. 5 shows a part of the structure of the charge storage portion, wherein the portion indicated by dotted and slant lines represents the channel stopper 16 and wherein parallel transfer electrodes 23, 24, 25, 26 of polysilicon layers are vertically formed on the surface of the layer between the channel stoppers 16 to provide CCD shift registers 27.

The width $W_2$ in the horizontal direction of the channel portion constituted by the transfer electrodes 23, 24, 25, 26 is set roughly equal to the width $W_1$ in the horizontal direction of the pair of the photosensitive block 14 and the photosensitive transfer block 15, whereas the channel length $L_2$ of each of the transfer electrodes 23, 24, 25, 26 of the charge storage portion 11 is set narrower than the channel length $L_1$ of each of the transfer electrodes 18, 19, 20, 21 of the photosensitive portion 10. The channel length $L_2$ is determined correspondingly to the quantity of signal charge transferred from the photosensitive transfer block 15. For example, in a case where $L_2$ is set half of channel $L_1$, the area occupied by the charge storage portion 11 can be made roughly half the area of the photosensitive portion 10. Further, each of the CCD shift registers 27 is subordinately connected to each pair of photosensitive portion 14 and the photosensitive transfer portion 15. Accordingly, it becomes possible to make the vertical width of the charge storage portion 11 narrower than that of the photosensitive portion 10.

The first horizontal charge transfer means 12 shown in FIG. 3 is formed between the photosensitive portion 10 and the charge storage portion 11 shown in FIGS. 4, 5. By applying predetermined gate voltage to the transfer gated $Tg_1$, $Tg_2$ and causing them to perform ON operation, the signal charge of the photosensitive portion 10 is transferred to the charge storage portion 11 through the first horizontal charge transfer means 12. There are horizontally formed in the first horizontal charge transfer means, the channel portions equal in number to the photosensitive transfer blocks 15 for electrically connecting the photosensitive transfer blocks 15 to the CCD shift registers 27 corresponding there to. Accordingly, the signal charges can be transferred from the photosensitive portion 10 to the charge storage portion 11 by turning on both of the transfer gates $Tg_1$, $Tg_2$, while by holding the transfer gates $Tg_1$, $Tg_2$ off and causing the first horizontal charge transfer means 12 to perform shift operation, the signal charges can be outputted from the output terminal 29.

In the case of the second horizontal charge transfer means 13, the channel portions equal in number to the CCD shift registers 27 of the charge storage portion 11 are horizontally formed and, by turning on the transfer gate $Tg_3$, the signal charges from the charge storage portion 11 are received, whereby the signals are sequentially outputted from the output terminal 30 through the horizontal shift operation.

A description will subsequently be given of a case where the operation of the solid pickup apparatus thus arranged is applied to an electronic camera.

When an optical image of an object is formed in the photosensitive portion 10 by means of shutter exposure, red and blue color signal charges are generated in light receiving elements of the photosensitive blocks 14 and a green signal charge is produced in each photosensitive transfer element of the photosensitive block 15. The transfer gates 22, $Tg_1$, $Tg_2$ are held off at the time of shutter exposure. Consequently, a mass of particular color signal charge is accumulated in each of the light receiving elements and photosensitive transfer elements.

Subsequently, the transfer gates $Tg_1$, $Tg_2$ are turned on and four-phase clock driven pulse signals $\Phi V_1$, $\Phi V_2$, $\Phi V_3$, $\Phi V_4$ are applied to the transfer electrodes 18, 19, 20, 21, respectively to transfer the green color signal charges of the photosensitive transfer blocks 15 to the charge storage portion 11. In this case, because the synchronous pulse signals $\Phi V_1$, $\Phi V_2$, $\Phi V_3$, $\Phi V_4$ are applied to the transfer electrodes 23, 24, 25, 26 of the charge storage portion 11, the green color signal charges as they are originally arranged in the photosensitive transfer blocks 15 are transferred to the charge storage portion 11.

Subsequently, the transfer gates $Tg_1$, $Tg_2$, $Tg_3$ are turned off and closed, whereas the transfer gate 22 is turned on and opened. Then the red and blue color signal charges of the light receiving elements of the photosensitive blocks 14 are transferred to the photosensitive transfer elements of the photosensitive transfer blocks 15.

By making the transfer gates $Tg_2$, 22 closed, the transfer gates $Tg_1$, $Tg_3$ opened and applying the four-phase pulse signal $\Phi V_1$–$\Phi V_4$ to the transfer electrodes 18–21, 23–26 of the photosensitive portion 10 and the charge storage portion 11, respectively the red or blue color signal charges equivalent to one line in the horizontal direction of the photosensitive transfer blocks 15 are transferred to the first horizontal charge transfer means 12 and simultaneously the green color signal charges equivalent to one line in the horizontal direction of the CCD shift registers 27 are transferred to the second horizontal charge transfer means 13. Then the drive signals synchronous with the first and second horizontal charge transfer means 12, 13 are applied thereto to make them perform a shift operation, so that color signals equivalent to the red or blue and green color signal charges are outputted from the output terminals 29, 30. Upon completion of the transfer of the color signal charges equivalent to one line, color signal charges equivalent to one line are transferred to the first and second horizontal transfer means 12, 13 again and the repetition of the control operation allows image signals equivalent to one image generated in the photosensitive portion 10 to be outputted. The shutter exposure is further repeated to obtain image signals equivalent to the next image.

The control of the drive signals and the transfer gates is implemented by a drive control circuit and electric signals corresponding to the interline arrangement are available to both the fields A, B.

In the aforesaid first embodiment, two horizontal charge transfer means are provided between the photosensitive portion and the charge storage portion and on the side of the charge storage portion, respectively, to separate the color signals R/B and G and output.

Figure 6:
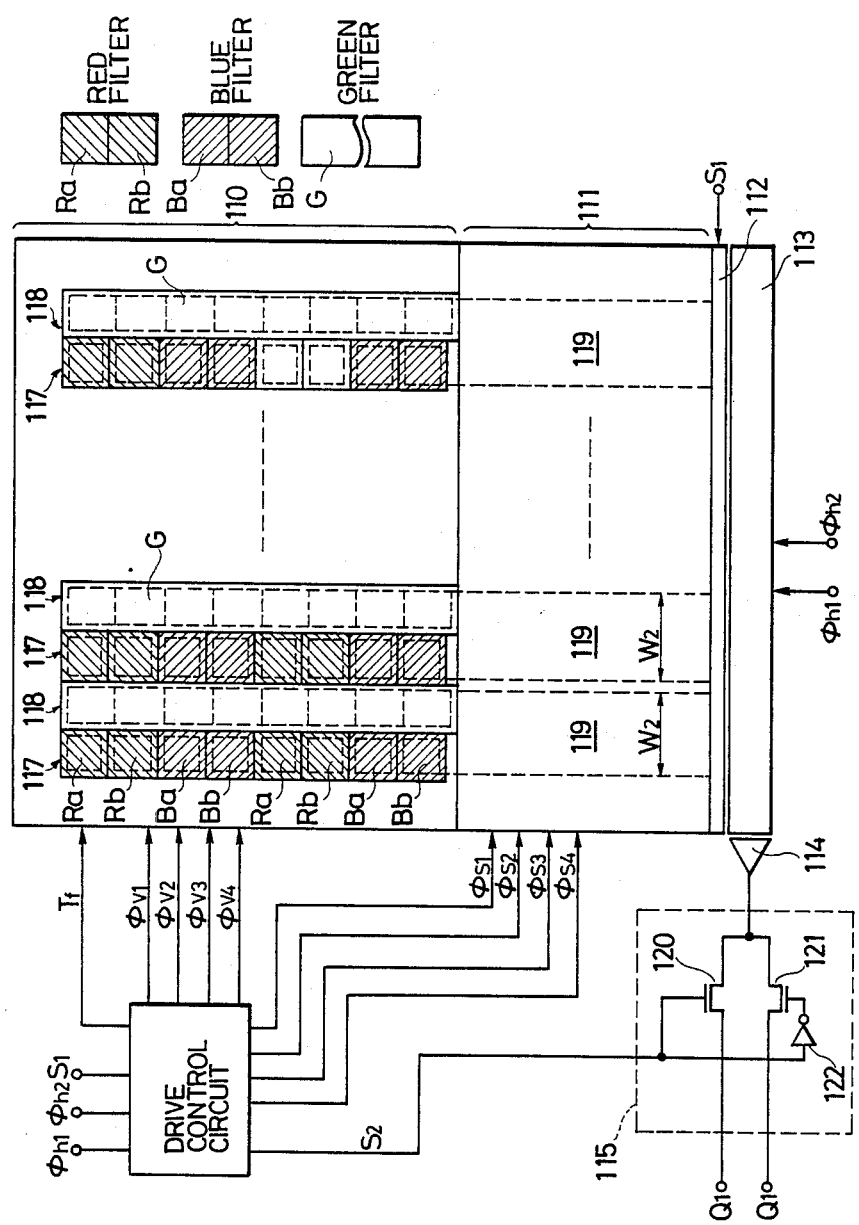
FIG. 6 represents a schematic structural view of a second solid pickup apparatus embodying the present invention.
Figure 7:
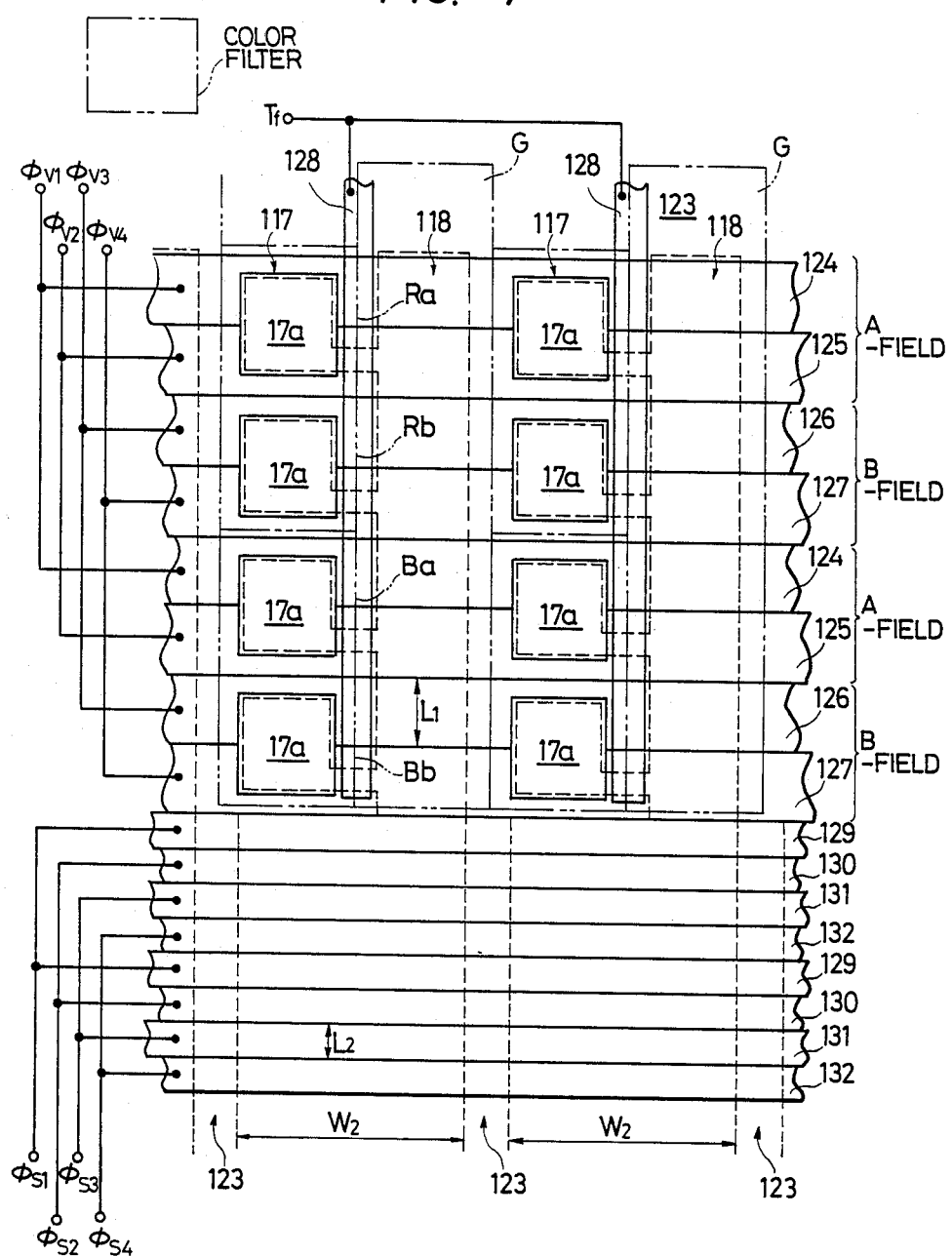
FIGS. 7 and 8 show in detail the principal part of the surface of the construction of FIG. 6.
Figure 8:
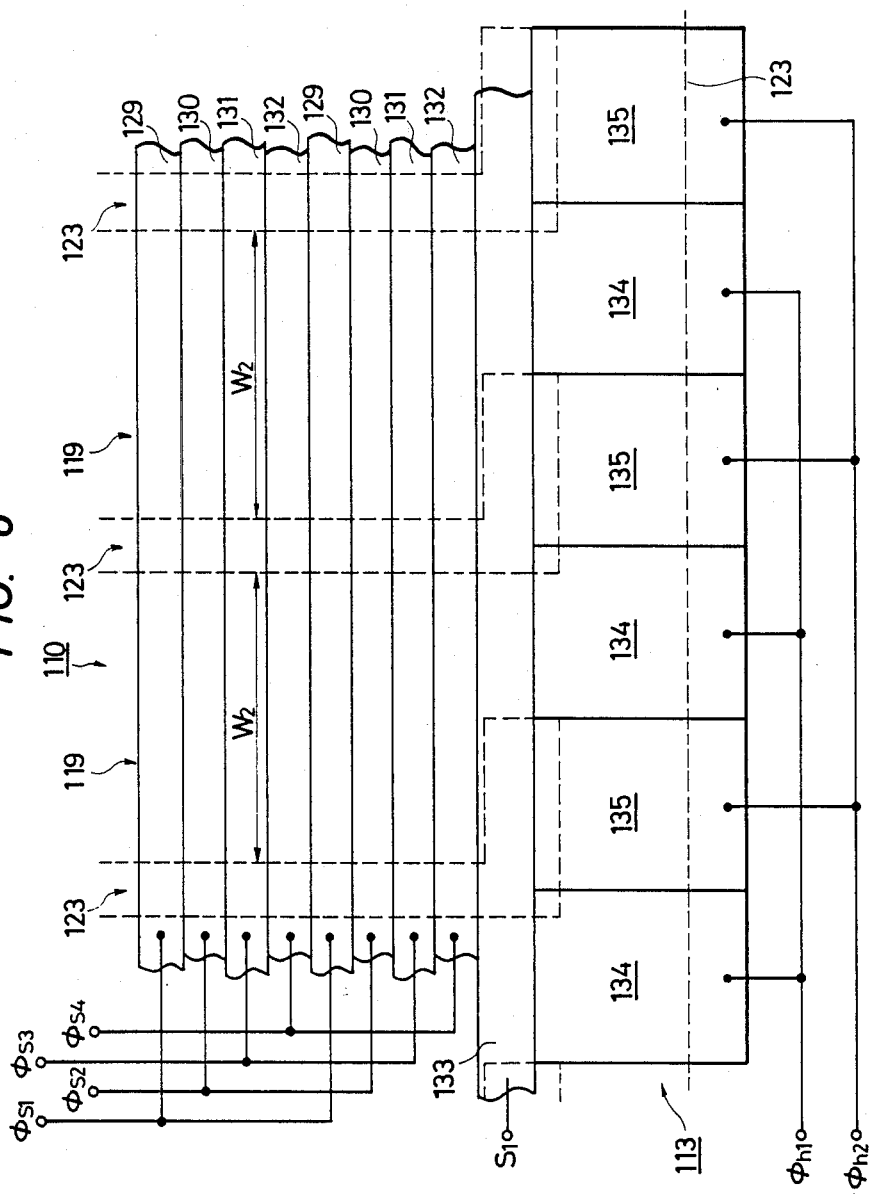

In the second embodiment shown in FIGS. 6-8, it is possible to obtain color signals R/B and G independently of each other from one horizontal transfer means by arranging a switching circuit at the output terminal of the horizontal charge transfer means positioned on the side of the charge storage portion.

FIG. 6 is a schematic structural view of a solid pickup apparatus, as a second embodiment of the present invention, manufactured through circuit integration technology, wherein the solid pickup apparatus comprises a photosensitive portion 110, a charge storage portion 111, a transfer gate 112, a horizontal shift register 113, a buffer amplifier 114, a switching circuit 115 and a drive control circuit 116 simply shown in the form of an individual block.

FIGS. 7, 8 show the detailed principal portions of the surfaces indicative of the structure of the solid pickup apparatus of FIG. 6. FIG. 7 shows the connecting portion between the photosensitive portion 110 and the charge storage portion 111; and FIG. 8 shows The connecting portions between the charge storage portion 111 and the transfer gate 112 and between the charge storage portion 111 and the horizontal shift register 113.

The structure and function of the photosensitive portion and the photosensitive transfer portion shown in FIGS. 6, 7, 8 are similar to those of the first embodiment shown in FIGS. 3-5 and the detailed description of them will be omitted.

The horizontal CCD shift register 113 is formed at the end of the charge storage portion 111 through the transfer gate 112 and the output means of the horizontal CCD shift register 113 is connected to the switching circuit 115 through the buffer amplifier 114.

The switching circuit 115 has gate elements 120 and 121 such as transmission gates whose one node is commonly connected to the output terminal of the buffer amplifier 114 and the other is separately connected to output terminals $Q_1$, $Q_2$, respectively the gate elements, 120, 121 are mutually exclusively turned on and off by an inverter 122 connected therebetween.

The drive control circuit 116 produces, e.g., four-phase drive signals $\Phi v_1$-$\Phi v_2$, $\Phi s_1$-$\Phi s_2$ applied to the photosensitive portion 10 and the charge storage portion 11 respectively; a control signal $S_1$ for controlling the on/off operation of the transfer gate 12; two-phase drive signals $\Phi h_1$, $\Phi h_2$ for controlling the shift operation of the horizontal shift register 13; and a switch control signal $S_2$ for controlling the switching of the switching circuit 15.

In FIG. 7, the portion enclosed by a dotted line is a channel stopper 123 formed on a silicon substrate and in the portion enclosed by the channel stopper 123 are light receiving elements 117a of a photosensitive block 117 and a photosensitive transfer block 118, i.e., a self-scanning type CCD shift register, as described in the first embodiment. As shown by an alternate long and two short dashed line of FIG. 7, red and blue color filters Ra, Rb, Ba,Bb so arranged as shown in FIG. 6 are installed in the photosensitive blocks 117, whereas the photosensitive transfer blocks are covered with a striped green filter G.

The width $W_2$ in the horizontal direction of the channel constituted by the transfer electrodes 124–127 is roughly set equal to that between a pair of photosensitive block 117 and photosensitive transfer block 118 in the horizontal direction. The length $L_2$ of each channel constituted by the transfer electrodes 124–127 of the photosensitive transfer block 118 is set narrower than the channel length $L_1$ of each of the transfer electrodes 124–127 of the photosensitive transfer portion 118. For instance, the length $L_2$ is set about half each channel length $L_1$ in this embodiment. The value the length is set to is made to correspond to the quantity of signal charge being transferred from the photosensitive transfer block 118, so that the area occupied by the charge storage portion 111 can effectively be set smaller than the area of the photosensitive portion 110. For example, in a case where $L_2$ is set half of channel $L_1$, the area occupied by the charge storage portion 111 can be made roughly half the area of the photosensitive portion 110.

In FIG. 8, the horizontal shift register 113 is formed on the output side of the charge storage portion 111 through the transfer gate 112. Polysilicon wiring 133 provided in parallel to the transfer electrode 132 is installed at the end of the charge storage portion 111 and forms the on/off channel of the transfer gate 112 and, under the control of the control signal $S_1$, controls the on/off state of the transfer of the Signal charge from the vertical CCD shift register 119 to the horizontal shift register 113

CCD shift registers constitute the horizontal shift register and, by applying predetermined drive signals, e.g., two-phase drive signals $\Phi h_1$, $\Phi h_2$ to horizontally-arranged transfer electrodes 134, 135, the signal charges equivalent to one line, which are transferred from the charge storage portion 110 are sequentially transferred to the buffer amplifier 114.

Subsequently, a description will be given of a case where the operation of the solid pickup apparatus thus arranged is applied to a system for color printing based on image data obtained from an electronic color camera.

Figure 9:
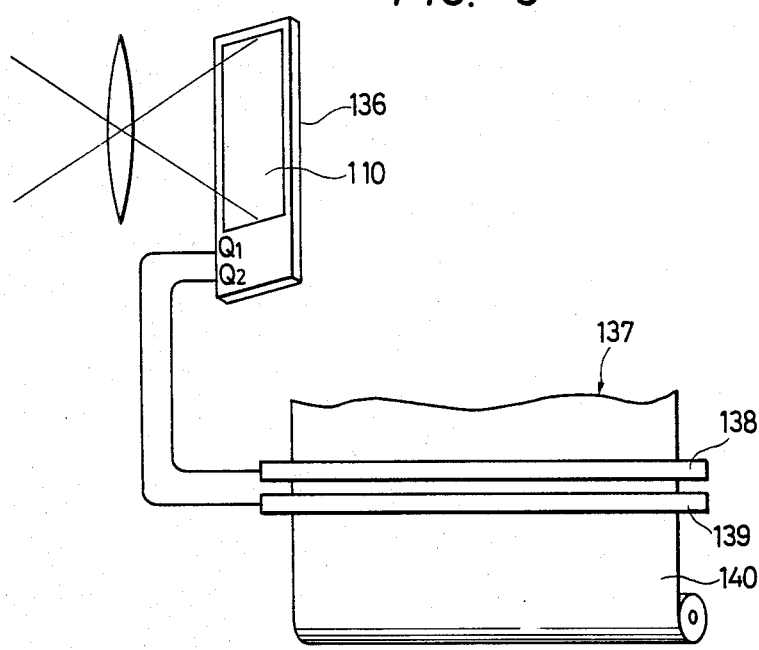
FIG. 9 shows a schematic arrangement where the solid pickup element embodying the present invention is applied to printing equipment.

FIG. 9 is a schematic structural view of the aforesaid system, wherein a solid pickup apparatus 136 is installed in the following stage of an electronic color camera as an optical system. The output terminals $Q_1$, $Q_2$ of the solid pickup apparatus 136 are respectively connected to the printing heads 138, 139 of a printer 137 so that the output of the former is supplied to the red and blue color printing head 138 and the output of the latter is supplied to the green color recording head 139. Printing paper 140 (not shown) supplied onto the platen of the printer 137 is printed with color images.

An optical image of an object is first formed on a photosensitive portion 110 through the shutter exposure of the electronic camera and red and blue color signal charges are produced in the light receiving elements 117a of the photosensitive blocks 117, whereas green color signal charges are generated in the photosensitive transfer elements of the photosensitive transfer blocks 118.

Subsequently, the shutter is closed a predetermined time later and drive signals $\Phi v_1$-$\Phi v_4$, $\Phi s_1$-$\Phi s_4$ are respectively supplied by a drive control circuit 116 to the transfer electrodes 124–127, 129–132 of the photosensitive portion 110 and the charge storage portion 111 to transfer the green color signal charges to the charge storage portion 111. Upon completion of the transfer of all the charges in the photosensitive transfer blocks 118, the supply of the drive signals $\Phi v_1$-$\Phi v_4$, $\Phi s_1$-$\Phi s_4$ is stopped and, after a control signal $S_1$ is supplied to a transfer gate 112 to open the channels, the drive signals Φs₁–Φs₄ are supplied to transfer signal charges amounting to one line from the charge storage portion 111 to a horizontal shift register 113. Then drive signals Φh₁, Φh₂ are supplied to the horizontal shift register 113 to transfer the green color signal charges to a buffer amplifier 114. Before the transfer operation of the horizontal shift register 113 is started, gate elements 120, 121 are so arranged as to be respectively turned on and off by a control signal S₂ produced by the drive control circuit 116. Consequently, as shown in FIG. 9, green color signals are supplied from the output terminal Q₂ to the green color recording head 139 and green color picture element data equivalent to one horizontal scanning is printed on the paper.

The aforesaid output operation of the green color signals by means of the charge storage portion 111, the transfer gate 112 and the horizontal shift register 113 is repeated on a horizontal scanning basis and, through the relative movement of the green color recording head synchronous with the one horizontal scanning on the paper, green data equivalent to one image is printed.

On the termination of the green color data printing, a control signal $T_f$ is supplied from the drive control circuit 116 to a transfer gate 128 FIG. 7 to open the channels and cause the red and blue color signal charges stored in the photosensitive blocks 117 to transfer to the photosensitive transfer blocks 118. Subsequently after the transfer gate 128 is closed again, all the red and blue color signal charges are transferred to the charge storage portion 111 in the same control of the transfer operation from the color signal charges corresponding to green color to the charge storage portion 111.

Upon completion of the aforesaid transfer, the gate elements 121, 120 of the switching circuit 115 are respectively opened and closed by the control signal S₂ and, as in the case of the transfer of the aforesaid recording color signal charges, the signal charge transfer operation on a horizontal scanning basis is repeated by the charge storage portion 111, the transfer gate 112 and the horizontal shift register 113 and the repetition of one horizontal scanning is synchronously carried out by the red and blue printing head 138 shown in FIG. 9, so that red and blue data is printed on the paper.

Exposure and the transfer of signal charges by means of the solid pickup apparatus is synchronized with the printing operation of the color printer 137, whereby color printing using an electronic camera can be facilitated.

Moreover, the nonexistence of the shaded horizontal transfer blocks as in the case of a conventional interline type solid pickup apparatus provides printing with excellent resolution in a horizontal direction.

Although a description has been given of the embodiment of the present invention applied to color printing, it is needless to say applicable to the regeneration of static images on monitor televisions.

As set forth above, the solid pickup apparatus according to the aforesaid embodiments of the present invention comprise photosensitive blocks, each of which consists of a plurality of light receiving elements functioning as a photoelectric converter arranged in a predetermined direction, photosensitive transfer blocks, each of which consists of a plurality of photosensitive transfer elements respectively provided for the light receiving elements through transfer gates and used to mutually transfer signal charges under predetermined transfer drive control, a charge storage portion for temporarily storing the signal charges from the photosensitive blocks, one or more horizontal shift registers for transferring the signal charges in the photosensitive transfer blocks and/or in the charge storage portion to the output terminal every line, and a switching circuit for switching and sending out signals equivalent to the signal charges given by the horizontal shift register, so that improvement in not only its resolution but also sensitivity becomes attainable since the number of elements capable of photoelectric conversion and the light receivable area have been increased. Moreover, since any desired color data is obtainable under the control of the switching means, the solid pickup apparatus according to the present invention is widely utilizable for display equipment such as electric still cameras, printing machines and monitor televisions.

Although it has been arranged that four-phase signals are used to drive the transfer electrodes in the aforesaid embodiments of the present invention the signals for use are not limited to four-phase. For example, two-phase signals are also usable. Moreover, the color filter arrangement and the number of horizontal transfer means are not limited to those described in the aforesaid embodiment.

Figure 10:
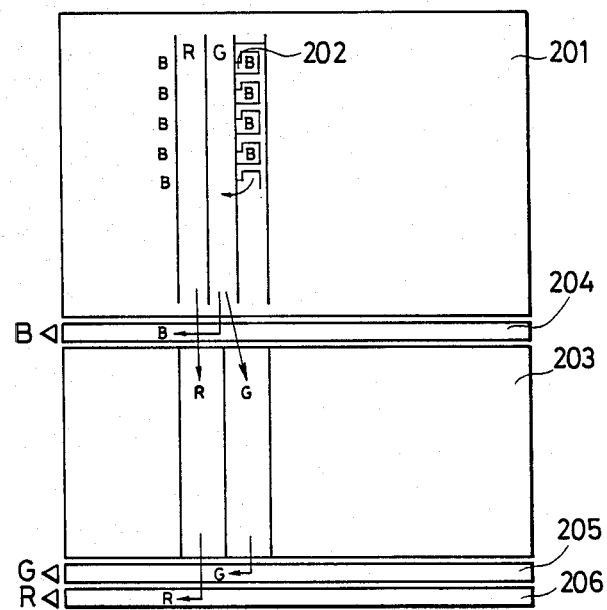
FIG. 10 represents a schematic structural view of a third solid pickup apparatus intended to describe its structure and operation.

In both the first and second embodiments, one (G) of the three primary colors or a complementary color has been arranged in the form of stripes on each filter for the photosensitive (vertical) transfer block and the two remaining colors (R,B) have been arranged in the form of a mosaic. In a third embodiment of the present invention shown in FIG. 10, three kinds of filters are vertically extended in the form of stripes and, of the three kinds of colors, two of them are used for filters in the photosensitive (vertical) transfer block and the last one is employed for filters in the photosensitive block. In general, short wavelength light, i.e., color B is largely absorbed by polysilicone used as transfer electrodes in the photosensitive (vertical) transfer blocks of the photosensitive portion in the frame transfer system, and therefore sensitivities of photoelectric conversion elements covered with colors R and G must be reduced in conformity with that of photoelectric conversion elements covered with the color B in accordance with the necessity of balancing the colors R, G, B. This results in reduction of the sensitivity of the solid pickup apparatus. On the contrary, not only sensitivity but also resolution can be improved by, as in the case of the aforesaid embodiments, employing the filters of color B for the photosensitive block and those of the remaining two colors (R, G) for the photosensitive transfer block. Referring to FIG. 10, the third embodiment will be described in detail. A light receiving portion 201 is provided with photoelectric conversion elements arranged in the form of a matrix and the light receiving zone 201 is covered with a microcolor filter. The microcolor filter bears three colors R, G, B corresponding to each photoelectric conversion element. The microcolor filter according to the present invention is arranged in the form of stripes having the same color in a vertical direction. In FIG. 10, the arrangement of the colors are schematically indicated by reference symbols R, G, B.

As the structure and function of a photosensitive block and a photosensitive transfer block were described above, details the photosensitive block and the photosensitive transfer block are not shown in FIG. 10. The photoelectric conversion elements arranged under the filters R and G in this case, play the role of a charge transfer element by themselves, each being covered with a polysilicone transparent electrode for transfer control. On the other hand, the surface of each photoelectric conversion element under the filter B is not covered with the polysilicone electrode. Instead, a transfer gate 202 is provided between the photoelectric conversion elements for colors B and G. In consequence, the photoelectric conversion element for the color G functions as what is used for color G photoelectric conversion, color G charge transfer and color B charge transfer.

In FIG. 10, a storage portion 203 is positioned under the light receiving portion 201. The signal charges produced by the color R/G photoelectric conversion elements are sequentially respectively sent to the storage portion through the photoelectric conversion elements themselves. After the completion of the transfer process, the signal charges generated by the color B photoelectric conversion elements are transferred to the color G photoelectric conversion elements through the transfer gates 202. At this time, preparation for reading out the signal charges becomes complete.

In FIG. 10, there are shown a horizontal CCD 204 for color B under the light receiving portion 201 and horizontal CCDs 205 for color G and 206 for color R under the storage portion 203. In the state wherein the preparation for reading the signal charges is completed, the color B signal charges stored in the color G photoelectric conversion elements and color G/R signal charges stored in the storage portion 3 are sequentially transferred to the horizontal CCDs 204, 205, 206 corresponding to the pertinent colors. The signal charges are read out of the horizontal CCDs 204, 205, 206 in the conventional known manner.

The solid pickup apparatus thus arranged offers resolution equivalent to that of a conventional FT type one and roughly the same light receiving area and aperture efficiency. Moreover, since the color B light receiving element is provided with no transparent element, it has sensitivity equivalent to what is offered by a conventional IT system. Accordingly, it is unnecessary to reduce the sensitivity of the other colors to balance the colors and extremely high sensitivity is available as a whole.

Since the storage portion need not accumulate the color B signal charges, the area occupied by chips becomes smaller than that occupied thereby in a conventional FT system and decreased requirements for accuracy in terms of manufacturing result in yield improvement.

Figure 11:
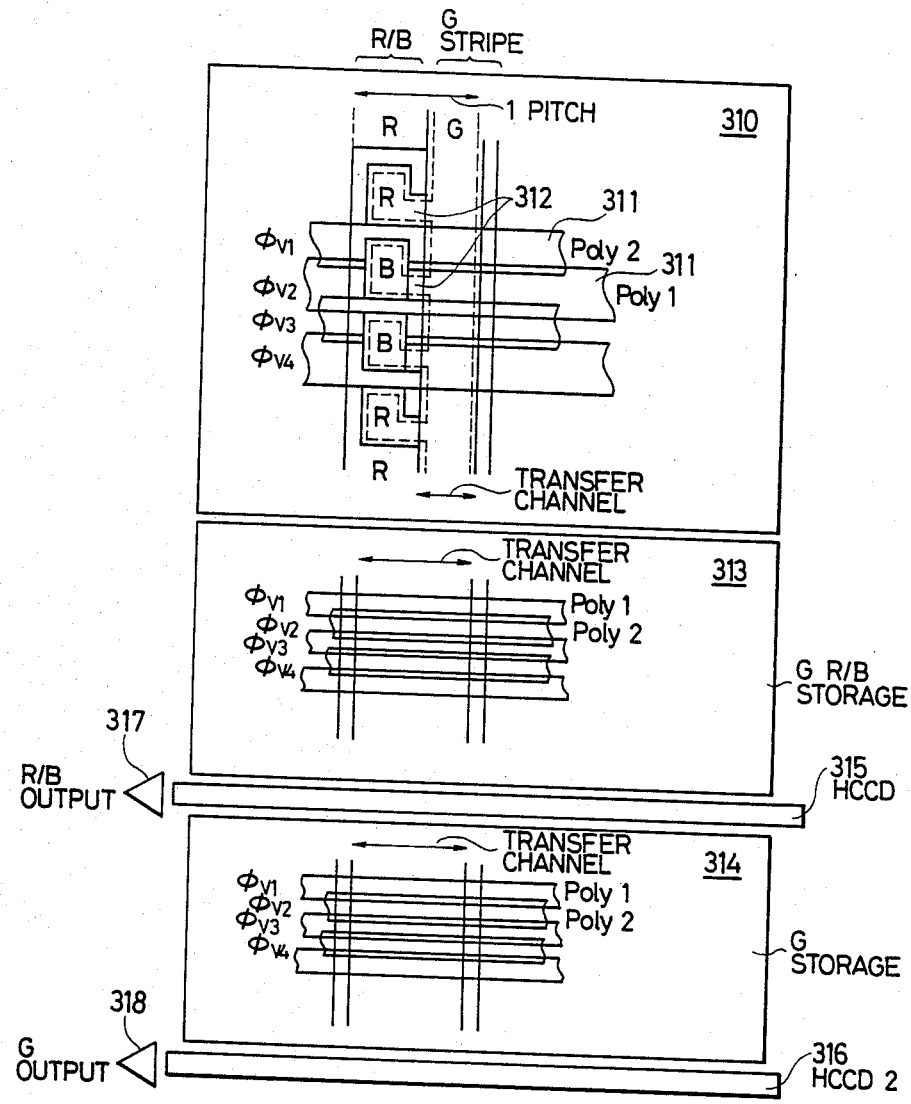
FIG. 11 represent a schematic structural view of a fourth solid pickup apparatus intended to describe its structure and operation.

FIG. 11 shows a fourth embodiment of the present invention. A microfilter color arrangement in this embodiment is such that one of the primary colors or complementary colors is arranged vertically and the remaining two colors of the primary colors or the complementary colors are alternately arranged in a vertical direction, each vertical row being arranged alternately in a horizontal direction. Moreover, the picture elements of the solid pickup apparatus corresponding to the first color are composed of the photoelectric conversion elements of the FT system and accordingly one charge storage portion and one horizontal CCD are provided for the first color. On the other hand, the picture elements corresponding to the second and third colors are composed of the photoelectric conversion elements of the IT system and therefore a transfer gate is provided between the second/third picture element and the first color element, whereas another charge storage portion and another horizontal CCD are provided for the second/third colors. The output of the first color picture element, i.e., the picture element at the end of the output side of the picture element coupled to the second/third color picture elements through the transfer gate is selectively stored in one of the charge storage portions.

The CCD type solid pickup element according to this embodiment operates under the FT method as far as the first color, e.g., G is concerned and under the IT method as far as the second and third colors, e.g., R and B are concerned. The signal charge formed in the color G photoelectric conversion element is transferred to the color G storage portion during the signal transfer period. During the aforesaid period, the color R/B signal charges remain in the photoelectric conversion elements. After all the color G signal charges have been transferred to the storage portion, the color R/B signal charges are transferred to the color G photoelectric conversion elements through the transfer gates. In other words, the color G photoelectric conversion elements then functions as a vertical charge transferer. The color R/B signal charges thus transferred into the color G photoelectric conversion elements are then transferred to the color R or B storage portion during the signal transfer period. As soon as all the color R/B signal charges have been transferred to the color R or B storage portion, these signal charges, together with the color G signal charges prepared in the color G storage portion, are simultaneously read out through the horizontal charge transfer means, i.e., the horizontal CCDs.

While the aforesaid color G photoelectric conversion elements operate as a vertical charge transfer means, they produce the color G signal charges as photoelectric conversion elements. However, since the vertical transfer of the signal charges to the storage portion is made at an extremely high speed, the influence of the mixture of the vertically transferred signal charges with the currently produced signal charges of the color G is minimized to the extent it is ignorable. Accordingly, it is unnecessary to shade the light receiving portion as in the case of a conventional element and the light receiving portion is usable for movies.

As set forth above, the color G, for instance, is actuated under the FT system and the colors R and B are under the IT system in the solid color pickup element according to this embodiment. At that time, the color G photoelectric conversion elements are used as a vertical transfer means based on the IT method and two storage portions for the colors G and R or B are provided at the output side terminal of the vertical transfer means to store the output signal in one of them.

Referring to the drawings, the aforesaid embodiment will be described.

In FIG. 11, the light receiving portion has photoelectric conversion elements arranged in the form of a matrix and is covered with a microcolor filter. The microcolor filter has three colors R, G, B corresponding to the photoelectric conversion elements. The structure of the microcolor filter according to this embodiment is such that it has a row of the same color, i.e., G vertically arranged, a row of alternate colors R and B in pair, the same color being arranged in the line direction, and the so-called G striped R/B lines sequentially alternately arranged in the horizontal direction. FIG. 11 shows a schematic arrangement of colors with the reference symbols R, G, B.

The photoelectric conversion element arranged under the filter G also plays the role of a charge transfer element and therefore the surface of each photoelectric conversion element is covered with a four-phase driven polysilicone transparent electrode 311 for transfer control. On the other hand, the surfaces of the photoelectric conversion elements under the filters R and B are opened and provided with no polysilicone electrodes. Instead, a transfer gate 312 is provided between each of the color R and B photoelectric conversion elements and the color G photoelectric conversion element. In the present embodiment, consequently, each color G photoelectric conversion element functions in three ways: color G photoelectric conversion; color G charge transfer; and color R or B charge transfer. The portion enclosed by a dotted line in FIG. 11 represents a channel stopper formed on the silicone base and the photoelectric elements and the charge transfer elements, i.e., self-scanning type CCD shift registers are formed in the portion enclosed by the channel stopper.

In FIG. 11, there are shown two charge storage portions 313, 314 under the light receiving portion 310: a first storage portion 313 is adjacent to the light receiving portion 310 and equipped with a first horizontal CCD 315 at its output terminal.

The second storage portion 314 is adjacent to the first storage portion 313 and arranged in such a position as to hold the first horizontal CCD 315 therebetween and further equipped with a second horizontal CCD 316 at its output terminal.

Transfer gates (not shown) are respectively installed in between the first storage portion 313 and the first horizontal CCD 315 and between the first horizontal CCD 315 and the second storage portion 314 so as to control the destinations of the signal charges as will be described later.

The signal charges generated by the color G photoelectric conversion elements are sent to the first storage portion 313 through the photoelectric conversion elements themselves. On the termination of the transfer process, the signal charges generated by the color R and B photoelectric conversion elements are transferred to the emptied color G photoelectric conversion elements through the transfer gate 312.

Subsequently, the color G signal charges already stored in the first storage portion 313 are transferred to the second storage portion 314 and the color R/B signal charges transferred to the color G photoelectric conversion elements are sent to the first storage portion 313, whereby they are ready for being read out. However, the control of the signal charge transfer is not limited to the aforesaid pattern and, for instance, it is possible to have the transfer of the color R/B signal charges started after the color G signal charges are transferred to the second storage portion first.

Upon completion of preparation for the reading of signal charges, the color R/B signal charges stored in the first storage portion and the color G signal charges stored in the second storage portion are sequentially transferred to the horizontal CCDs 315, 316 of relevant colors. The signal charges are read out of the horizontal CCDs 315, 316 in a conventionally known manner and field signals for the NTSC system through buffer amplifiers 317, 318. The color R/B signal charges are separated by a switching circuit (not shown) installed in the rear stage of the buffer amplifier 317.

Although a reference has been made to a color filter composed of the three primary colors, it is easily be understood that the three primary colors may be replaced with complementary colors.

The solid pickup element according to the present embodiment has two charge storage portions and, after all the signal charges generated in the light receiving portion are distributed between the storage portions, they are read out by each horizontal CCD. The light receiving portion is thereby free from being shaded and is also usable for movies. Moreover, by providing the light receiving zone in the form of an FT-IT hybrid type CCD and arranging a filter for each IT type vertical transfer means as a light receiving block, horizontal resolution twice as great as that of a conventional IT system can be obtained. Since the color B light receiving element has no transparent electrode, the disadvantages of the FT system are eliminated and offers sensitivity equivalent to that of the conventional IT system. Consequently, it is unnecessary to reduce its sensitivity to the other colors to provide color balance, so that extremely high sensitivity is available as a whole.

Figure 12:
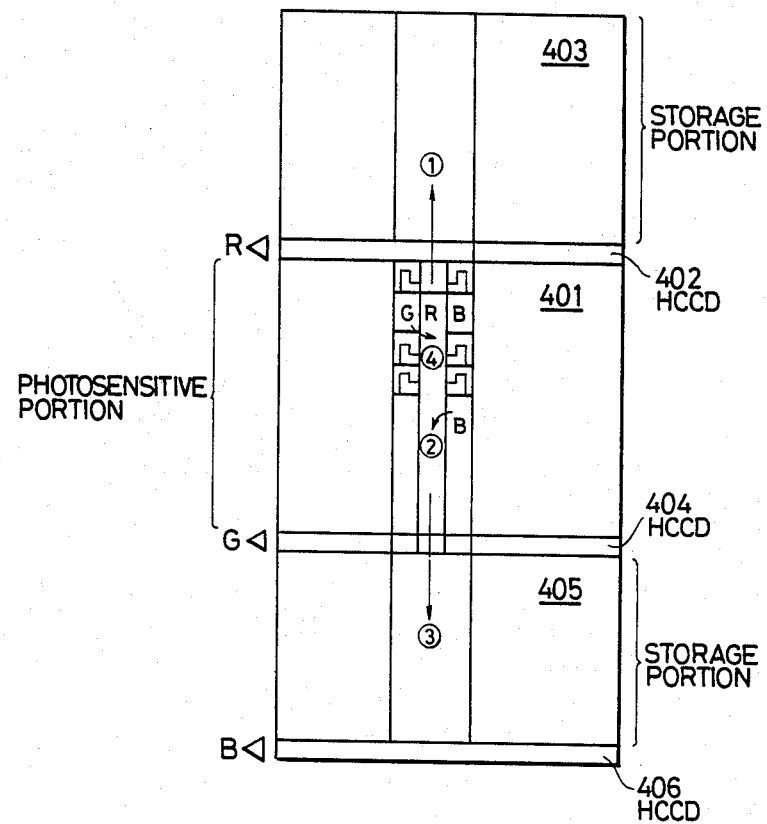
FIG. 12 represents a schematic structural view of a fifth solid pickup apparatus intended to describe its structure and operation.

FIG. 12 shows a fifth embodiment of the present invention. In this case, there are arranged two charge storage portions while a light receiving portion is sandwiched therebetween. Of the three primary colors or complementary color filters, two of them are allotted for use as those of photosensitive blocks in the light receiving portion and the remaining color filters for use as those of (vertical) transfer blocks. In this embodiment, R color filters are adopted into the photosensitive transfer blocks to prevent transfer electrodes of polysilicon from reducing sensitivity on the short wavelength side.

The CCD solid pickup element according to this embodiment operates under the frame transfer system for long wavelength light and under the interline transfer system for intermediate wavelength light. The use of R, G and B stripe filters, for instance, causes the signal charges formed in color R photoelectric conversion elements to transfer to the first color R signal storage portion during the signal transfer period. During that period, the color G/B signal charges remain in the photoelectric conversion elements. When all the color R signal charges are transferred to the first storage portion, either G or B, e.g., color G signal charges are transferred to the color R photoelectric conversion elements through the transfer gates. That is, the color R photoelectric conversion elements act as vertical transfer means henceforth. At this time, the vertical transfer means transfer the color B signal charges in a direction opposite to the transfer direction of the preceding color signal charges and store them in the second signal charge storage portion prepared on the other output terminal side of the vertical transfer means provided opposite to the first storage portion. When all the color B signal charges are transferred to the second storage portion, the color G signal charges are subsequently transferred to the color R photoelectric conversion elements again through the transfer gates. The color R/B signal charges are respectively prepared in the storage portions and the color G signal charges are also prepared in the color R photoelectric conversion elements for use as vertical transfer means. All the signal charges are simultaneously read out through the horizontal charge transfer means, i.e., horizontal CCD.

The light incident on the light receiving portion must be, needless to say, shaded by a shading means, e.g., a mechanical shutter during the transfer of the aforesaid charges.

The solid color pickup element according to the present embodiment operates under the FT system with respect to the long wavelength light color and under the IT system regarding the intermediate and short wavelength light colors. In the IT system, however, the long wavelength light photoelectric conversion elements operate as the vertical charge transfer means for transferring the short and intermediate wavelength signal charges.

Moreover, because one vertical transfer means is used to read out the short and intermediate wavelength signal charges sequentially, the threshold voltages Vth of the transfer gates are set different from each other. Further, there are provided two signal storage portions and three horizontal CCDs to simultaneously read out all the signal charges.

Referring to the drawings, this embodiment will be described as follows.

Figure 13:
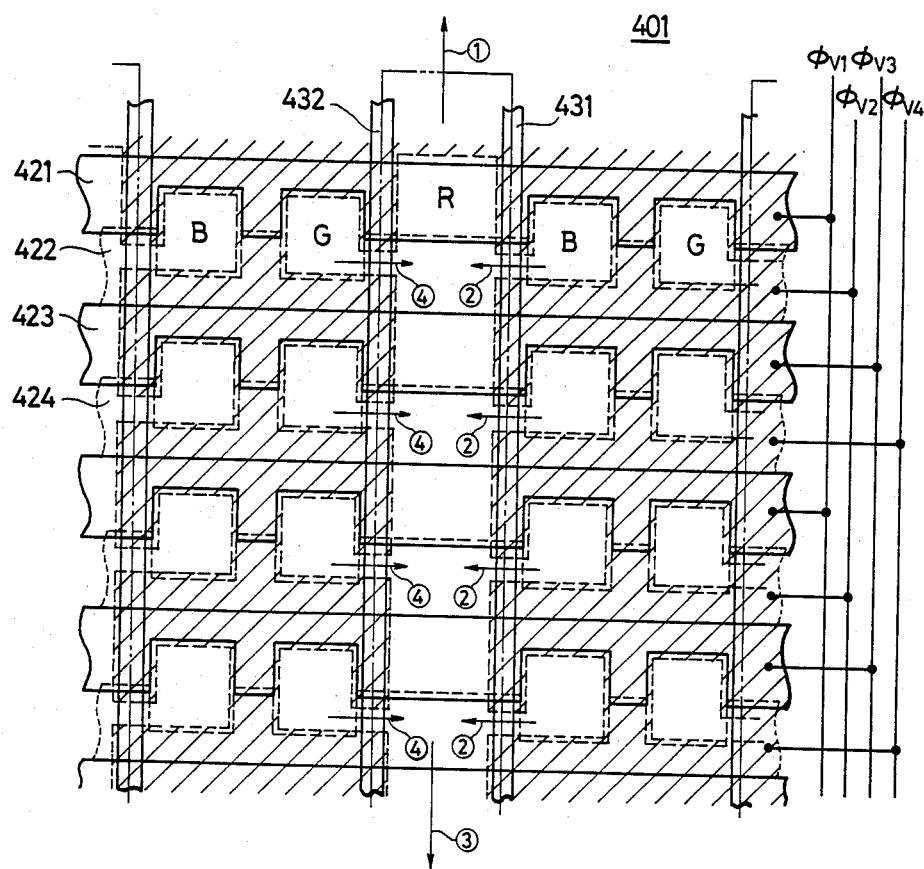
FIG. 13 represents an enlarge view illustrating the first light receiving zone of FIG. 1.

FIG. 12 is a schematic illustration of the solid pickup element according to the present embodiment and FIG. 13 is an enlarged view of the light receiving portion. The light receiving portion 401 has photoelectric conversion elements arranged in the form of a matrix and covered with a microcolor filter. The microcolor filter has three colors corresponding to the respective photoelectric conversion elements. The microcolor film thus arranged is formed with a stripe arrangement wherein the same color is vertically arranged. The reference symbols R. G. B show the schematic arrangement of the colors.

The arrangement of the colors R, G, and B is such that a plurality of combinations of the color R and the parallel colors G and B on both sides thereof are horizontally arranged. The photoelectric conversion element arranged under each filter R is formed in conformity with the FT system and, since the element itself also performs the role of a charge transfer element, the photoelectric conversion elements are covered with four-phase driven ($\Phi v_1$–$\Phi v_4$) transparent electrodes 421–424 of polysilicone for transfer control. On the other hand, the photoelectric conversion elements under the filters G, B are formed in conformity with the IT system and accordingly the surfaces thereof are open and provided with no polysilicone electrodes. Instead, transfer gates 431, 432 are respectively installed between the color B/G photoelectric conversion elements and the color R photoelectric elements. The threshold voltages Vth of the transfer gates 431, 432 are provided in such a manner that they differ from each other and, in this embodiment, set at color B Vth < color G Vth. As is obvious from the above description, the color R photoelectric conversion elements function in three ways: as color R photoelectric converters; as color B charge transferers; and as color G charge transferers.

In FIG. 13, the portion indicated by slant lines represents a channel stopper formed on the silicone base and, in the portion enclosed by the channel stopper, there are formed the photoelectric conversion elements and the charge transfer elements, i.e., self-scanning type CCD shift registers.

As shown in FIG. 12, a first color R signal storage portion 403 is provided above the light receiving portion 401 through a horizontal CCD 402. A second color B signal storage portion 405 is provided under the light receiving portion 401 through a color G horizontal CCD 404 and, at the output terminal of the second signal storage portion 405, a color B horizontal CCD 406 is provided.

The signal charges generated by the color R photoelectric conversion elements are sequentially sent from the lines in order closer to the first signal storage side to the storage portion (indicated by an arrow ①) 403. On the termination of the transfer process, the signal charges produced by the color B photoelectric conversion elements are field-to-field shifted (indicated by an arrow ②) to the emptied color R photoelectric conversion elements through transfer gates 431. At this time, since the threshold voltages for opening the transfer gates 431, 432 are so arranged as described above that Vth for color B < Vth for color G, only the color B gate 431 is opened when the lower voltage (Vth for color B) is applied. The color B signal charged thus field-to-field shifted to the color R photoelectric photoelectric conversion elements are subsequently transferred in the direction opposited to the transfer direction of the color R under the control of the transfer electrodes $\Phi v_1$–$\Phi v_4$ and sent to the second signal storage portion 405 (indicated by an arrow ③ therein). On the termination of the transfer process, the voltage higher than the preceding threshold voltage is applied to open the transfer gates 432. Although the color B transfer gates are also opened, no problem is posed at that time because the color B signal charges have already been discharged. The signal charges produced in the color G photoelectric conversion elements by the color G transfer gates 432 are ultimately field-to-field shifted (indicated by an arrow ④) to the color R photoelectric conversion elements. Preparations for reading out all the color signal charges are then completed. Upon the completion of the preparations for reading out the signal charges, the color G signal charges stored in the color G photoelectric conversion elements, the R signal charges stored in the first storage portion 403 and the color B signal charges stored in the second storage portion 405 are sequentially transferred to the corresponding horizontal color CCDs 402, 404, 406. The signal charges are read out of the horizontal CCDs 402, 404, 406 in the conventional known manner.

The aperture area in the surface of each of the color G/B photoelectric conversion elements is set so that a suitable color balance is obtained in conformity with their sensitivities. In the aforesaid embodiment, although the threshold voltages of the color B/G transfer gates 431, 432 are set different from each other, they may be controlled under uniform voltage with wiring arranged separately. However, that method is not always preferable because the wiring will be complicated. Moreover, the order wherein the color B/G signal charges are field-to-field shifted or the selection of the signal charges stored in the second signal storage portion may be altered. Further, the arrangement of the positions of respective horizontal color CCDs 402, 404, 406 is not limited to what has been shown in FIG. 12.

The present embodiment is needless to say applicable to the solid pickup element having complementary color filters.

The solid pickup element according to the present embodiment offers relatively improved sensitivity by transferring high sensitive long wavelength signal charges under the FT system and low sensitive intermediate and short wavelength signal charges under the IT system, whereby the total color balance is improved.

Figure 14:
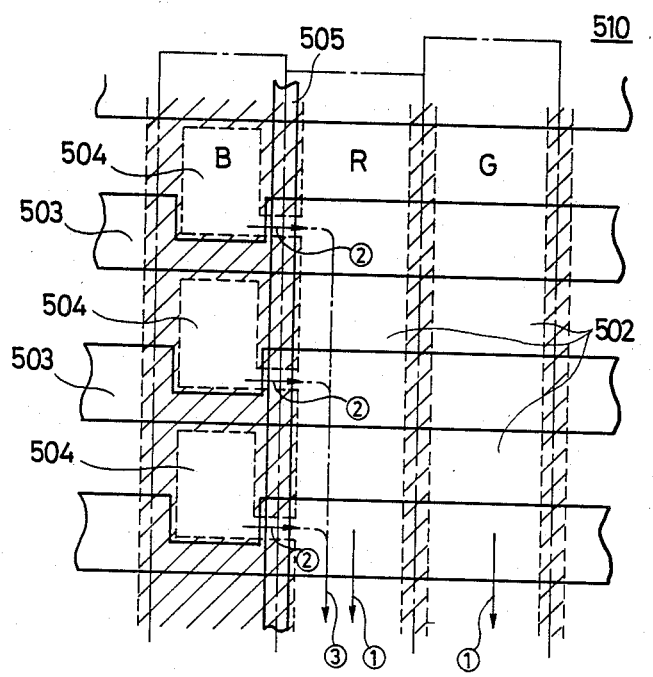
FIG. 14 is a structural view illustrating a sixth embodiment of the present invention.

In a sixth embodiment of the present invention as shown in FIG. 14, the influence of polysilicone transfer electrodes may be eliminated likewise. In other words, the surface of each photoelectric element is completely open at least for the corresponding short wavelength light in this embodiment and covered with no polysilicone transfer electrode. Accordingly, it operates under the interline transfer (IT) system, whereas the pickup portion is composed of virtual phase CCDs as far as long or intermediate wavelength light is concerned. Accordingly, the charge transfer process is such that the signal charges formed in the long or intermediate wavelength light color R/G photoelectric conversion elements are single-phase driven by virtual phase electrodes first and transferred to a signal storage portion during the signal transfer period. During that period, short wavelength light color B signal charges remain in the photoelectric conversion elements. After all the color R or G signal charges are transferred to a signal storage portion and further read out of a horizontal CCD, the color B signal charges are field-to-field shifted to the color R or G photoelectric conversion elements. In other words, the color R or G photoelectric conversion elements operate as a color B vertical transfer line and transfer the color B signal charges to the signal storage portion as in the case of color R or G. Then the color B charges are read out through the horizontal CCD.

The light incident on the pickup portion during the vertical color B transfer must be, needless to say, shaded by a shading means such as a mechanical shutter.

As set forth above, each polysilicone transfer electrode in the image sensor according to the present embodiment has a completely opened window as far as at least a short wavelength color is involved and a partially opened window by means of the virtual phase electrode with respect to long or intermediate wavelength light, whereby sensitivity as a whole is improved and sensitivity of short wavelength light is further improved.

Referring to the accompanied drawing, the embodiment of the present embodiment will be described in detail.

Figure 16:
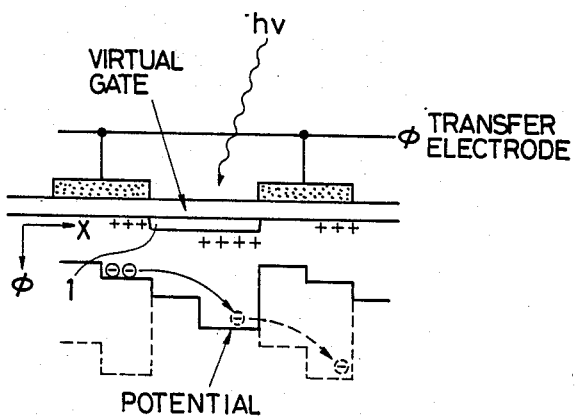
FIG. 16 is a diagram illustrating a conventional virtual phase CCD.

FIG. 14 shows a structural view of the pickup portion of an image sensor embodying the present invention. The pickup portion 510 has photoelectric conversion elements arranged in the form of a matrix and is covered with a microcolor filter. The microcolor film thus arranged according to the present is formed with a stripe arrangement wherein the same color is vertically arranged. The reference symbols R, G, and B show the schematic arrangement of the colors. The photoelectric elements themselves arranged under the color R/G filters play the role of charge transfer elements and the transfer operation is performed by the single-phase driven virtual phase CCDs. In other words, the virtual phase CCD construction is, as shown in FIG. 16 illustrating the conventional elements, such that one of the two two-phase driven electrodes is used as a diffusing layer (virtual electrode) within the channel and an open window 1 is provided for that portion. Moreover, because the simultaneous use of the electrode as a virtual electrode is not sufficient to let it function satisfactorily, the base density is changed by ion injection, whereby it is facilitated for the signal charges to transfer to the portion under the virtual electrode and the next electrode. On the other hand, the photoelectric conversion element itself of each picture element corresponding to the color B does not function as a charge transferer. Consequently, the surface of each element is free from a polysilicone transfer electrode 502 and provided with a completely opened window 504. The signal charges resulting from the color B are vertically transferred through the color R transfer lines adjacent thereto. Accordingly, there are provided transfer gates 505 between the color B/R photoelectric conversion elements to control the field-to-field shifting of the color B signal charges. As is obvious from the description above, the color R photoelectric conversion element according to the present embodiment functions in three ways as a color R photoelectric converter, a charge transferer and a color B charge transferer.

Figure 15:
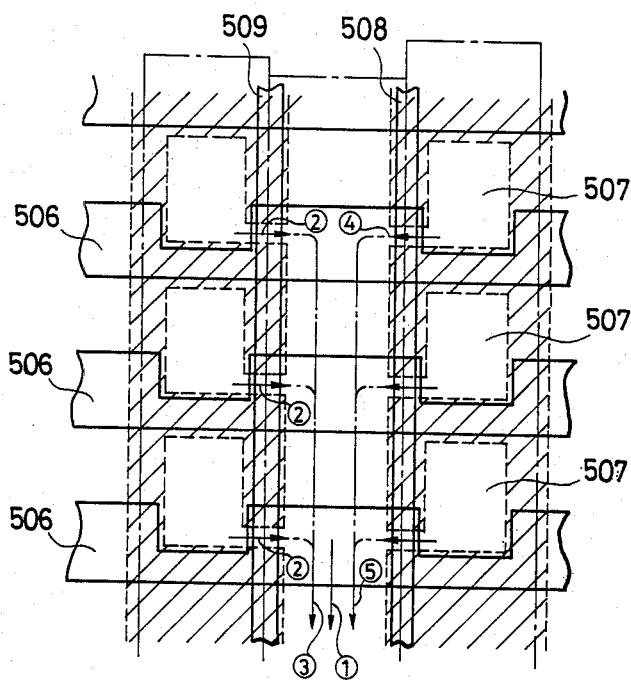
FIG. 15 is a structural view illustrating a seventh embodiment of the present invention.

In FIG. 15, the portion indicated by slant lines represents a channel stopper formed on the silicone base and, in the portion enclosed by the channel stopper, there are formed photoelectric elements and charge transfer elements, i.e., self-scanning type CCDs of virtual phase electrode construction.

The signal charges produced by the color R/G photoelectric conversion elements are sequentially sent from an output terminal positioned close to a signal storage portion (not shown) to the storage portion through the respective photoelectric conversion elements themselves (indicated by an arrow ①). Upon completion of the transfer of all the color R/G charges, the signal charges are sequentially read out of a horizontal CCD. On the termination of a series of transfer and readout processes in terms of the colors R and G, the signal charges generated by the color B photoelectric conversion elements are field-to-field shifted to the emptied color R photoelectric conversion elements through the opened transfer gates 505 (indicated by an arrow ②). The color B signal charges field-to-field shifted to the color R photoelectric conversion elements are vertically transferred as in the case of the color R or G charges (indicated by an arrow ③) and then read out through the horizontal CCD.

Although a description has been made of the charge storage portion to which the charges are transferred in the aforesaid embodiment, the storage portion may be omitted, i.e., the embodiment may be so constructed that only the pickup portion and the horizontal CCDs from a VPCCD operate in the so-called full-frame mode.

FIG. 15 shows a still another embodiment of the present invention, wherein each color G photoelectric conversion element shown in FIG. 14 has no polysilicon electrode 506 as in the case of the color B but a completely opened window 507. Accordingly, a color R transfer line is used to transfer the charges. For the aforesaid reason, there is installed a transfer gate 8 in between each of the color G photoelectric conversion elements and that of the color R photoelectric conversion elements as in the case of the transfer of the color B. The transfer of the signal is sequentially performed in terms of the color B or G after the color R. Accordingly, because the transfer gate 509 between the colors B and R and the transfer gate 508 between the colors G and R should be prevented from simultaneously operating, their threshold voltages are set different from each other.

As set forth above, a partial opening is provided on each virtual electrode by making the pickup portion have the VPCCD construction in the solid pickup apparatus embodying the present invention to improve the sensitivity on its long wavelength light side and, by forming a complete opening free from the transfer electrode on the short wavelength light side, an element having sensitivity higher than that of the simple VPCCD element is obtainable. Moreover, there substantially exists only one transfer electrode layer because of the VPCCD, thus its structure can be simplified.

Figure 17:
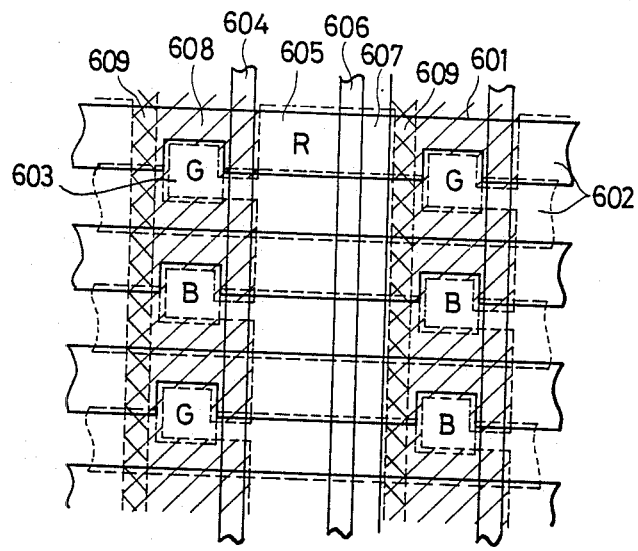
FIG. 17 is a top view of an element as an eighth embodiment of the present invention.
Figure 18:
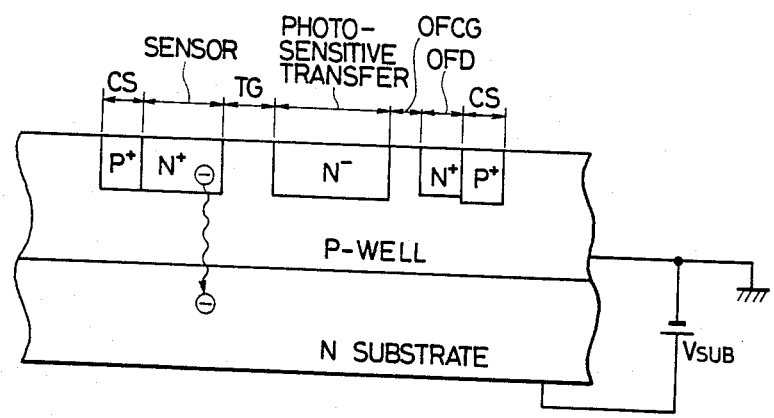
FIG. 18 is a sectional view of the element of FIG. 17.

FIGS. 17 and 18 show a seventh embodiment of the present invention.

In FIG. 17, the solid pickup element according to the present embodiment is of roughly the same construction as that of an interline transfer CCD. In the photoelectric conversion means 601, each photoelectric conversion element 603 is not covered with a polysilicone transfer electrode 602 and has a completely opened window. Furthermore, it is provided with a microcolor film having the same color in the horizontal direction and alternate two color in the vertical direction. Moreover, the same microcolor filter is arranged on each vertical transfer path 605 being connected to the photoelectric conversion element 603 through a transfer gate 604. In this case, reference symbols R, G, B designate the concept of the arrangement of the aforesaid color filters. Accordingly, the aforesaid vertical transfer channel 605 not only transfers the charge formed in the photoelectric conversion means 601 but also performs photoelectric conversion by itself.

In the element according to the present embodiment, there is provided a horizontal overflow drain (OFD) 607 between each vertical transfer channel 605 and an adjoining vertical photoelectric conversion element train through an overflow control gate (OFCG) 606 forming an overflow potential barrier.

The photoelectric conversion elements 603 arranged in the form of a matrix on the substrate are separated from each other by potential barriers 608 and each picture element train composed of the vertical photoelectric conversion element 603 and the vertical transfer channel 605 is isolated by the channel stopper.

As shown in FIG. 18, the photoelectric conversion means 1 is formed with the p-n junction and n+pn structure is formed between the photoelectric conversion and the n-type type substrate as shown in FIG. 18. Further, the given reverse bias voltage $V_{SUB}$ is applied between the p well and the n substrate, so that the vertical overflow drain (VOD) is provided.

Figure 19:
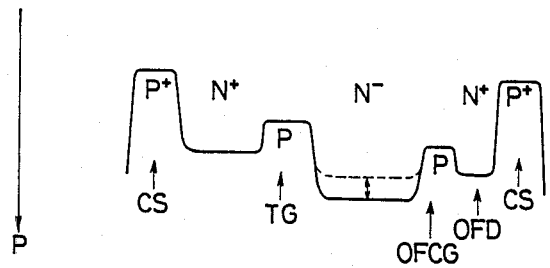
FIG. 19 is a potential profile.

FIG. 19 shows a potential profile of the solid pickup element thus constructed.

The OFCG is lower than the potential of the transfer gate 604 stored with the charge shown by a continuous line and set always higher than the maximum potential of the vertical transfer channel 605 vertically moved by the clock input as shown by a dotted line. Accordingly when an excessive charge is produced in the vertical transfer channel 605 functioning as a photoelectric conversion means, the charge jumps over the OFCG and is absorbed by the OFD. The potential of the channel stopper adjacent to the picture element is set even higher than that of the OFCG at that time and therefore the excessive charge is prevented from flowing into the picture element adjacent thereto. On the other hand when an excessive charge is produced in a depletion layer under the photoelectric conversion element 603 completely depleted by the application of the predetermined reverse bias voltage $V_{SUB}$, the p well and the n substrate are forward-biased and the charge is absorbed by the substrate.

If the p well under the photoelectric conversion element is then set deeper than the potentials of the transfer gate 604 and the channel stopper 609, the excessive charge is prevented from flowing into the adjoining picture element and the vertical transfer channel 605 but caused to totally flow into the substrate.

Figure 20:
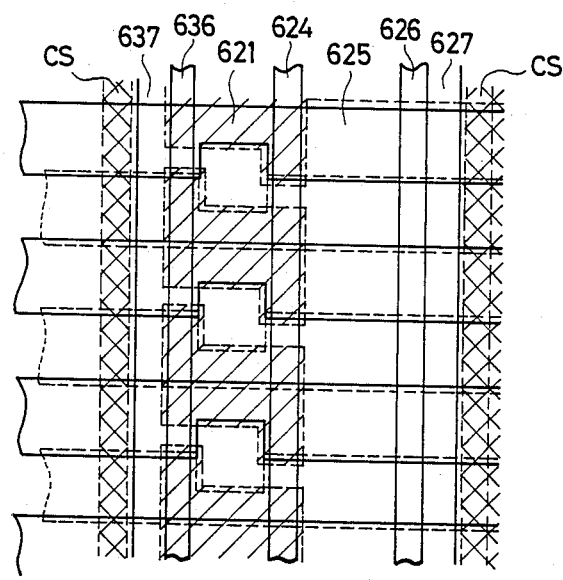
FIG. 20 is a top view of another embodiment of the present invention.

FIG. 20 shows an eighth embodiment of the present invention, wherein the VOD provided under the photoelectric element as shown in FIG. 17 through 19 is replaced with a lateral overflow drain (LOD) for absorbing the excessive charge produced in the photoelectric conversion means.

In other words, a first OFCG 626 and a first OFD 627 are provided along a vertical transfer channel 625 as in the aforesaid embodiment, whereas a second OFD 637 is provided along the vertical photoelectric conversion element train opposite to a transfer gate 624 like the vertical transfer channel side 625 through a second OFCG 636. At this time, the potential of the second OFCG 636 when stored with charge is set slightly lower than that of the transfer gate 624, so that the excessive charge produced in the photoelectric conversion block 621 is absorbed by the second OFD 637 before it flows into the vertical transfer channel 625.

As set forth above, since the solid pickup element according to those embodiments is provided with, in addition to the photoelectric conversion means, the means for absorbing the excessive charge produced in the vertical transfer channel functioning as a photoelectric converter, the blooming phenomenon can completely be suppressed and the blooming-resistant properties of the element as a whole becomes improvable. Moreover, the vertical transfer channel is equipped with the microfilter and employs it as a photosensitive block, whereby high image resolution and sensitivity are available.

Figure 21:
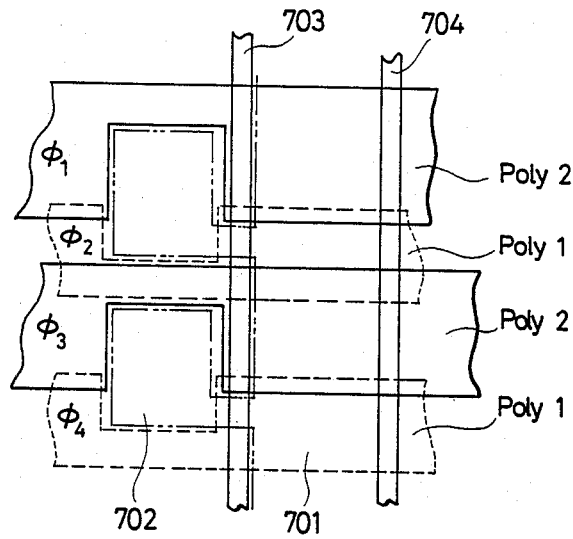
FIG. 21 is a top view of a solid pickup element to which a ninth embodiment of the present invention applies.

FIG. 21 shows a ninth embodiment of the present invention, which is intended to ensure the prevention of blooming on the vertical (photosensitive) transfer line referred to in the seventh and eighth embodiments by employing another means.

FIG. 21 is a top view of the principal part of the solid pickup element to which a blooming preventive means according to this embodiment is applied.

This solid pickup element employs a vertical transfer line 701 as a photosensitive block by arranging a microfilter on the vertical transfer line 701 of the conventional interline transfer type CCD as in the case of a photoelectric conversion means 702.

More specifically, the aforesaid vertical transfer line 701 is four-phase driven by a plurality of polysilicone transfer electrodes $\Phi_1$–$\Phi_4$ arranged along a horizontal direction corresponding to transfer elements, to transfer signal charges stored by the vertical transfer line itself in the transfer mode or those photoelectrically converted by photodiodes of the photoelectric conversion means and field-to-field shifted through a transfer gate 703.

On the other hand, one picture element is formed by the four electrodes $\Phi_1$–$\Phi_4$ vertically adjacent to each other in the aforesaid vertical transfer line 701 and, by the transfer gate 703 and a channel stopper 704 and by a potential barrier produced beneath the electrode to which a low level voltage has been applied, enclosed respectively in the horizontal and vertical directions.

In other words, a high level voltage is applied to the central two electrodes ($\Phi_2,\Phi_3$) among the four electrodes $\Phi_1$–$\Phi_4$ vertically adjacent to each other and the low level voltage is applied to those on both sides ($\Phi_1,\Phi_4$) whereby the photoelectrically converted signal charges are stored beneath the two electrodes ($\Phi_2,\Phi_3$) with a deepened potential.

In the method of suppressing blooming according to the present invention, among the four polysilicone transfer electrodes $\Phi_1$-$\Phi_4$, the electrode ($\Phi_1$) performing the role of a potential barrier in the storage mode without functioning as the transfer gate 703 of the photodiodes is supplied with the bias voltage superposed in the phase of alternating current.

More specifically, in the storage mode, the excessive charges overflowing the two electrodes $\Phi_2,\Phi_3$ because of blooming are caused to be recoupled to positive holes by the electrode ($\Phi_1$), supplied with the bias a.c. and oscillated, and eliminated on the interface between the silicone oxide film beneath the electrode and the base.

Figure 22:
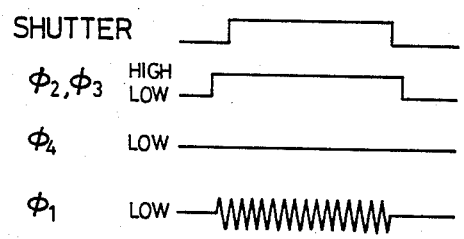
FIG. 22 is a diagram illustrating voltage applied to a transfer electrode in the storage mode.

FIG. 22 shows the voltage level applied to each electrode in the storage mode.

The aforesaid solid pickup element is exposed by the switching operation of the shutter of a photographing apparatus containing the element. In consequence, the solid pickup element operates in the storage mode during the exposure by means of the shutter and the high level d.c. voltage, e.g., about 2-15 V are applied to the transfer electrodes ($\Phi_2,\Phi_3$) during this time. On the other hand, the one electrode ($\Phi_4$) functioning as a barrier is supplied with voltage at between e.g., 0-9 V and kept at low levels. Moreover, the other one electrode ($\Phi_1$) for use as a barrier is also supplied with voltage at between, e.g., 0-5 V and maintained at low levels and bias a.c. oscillating between e.g., +4-7 V is superposed thereon.

Even if the bias a.c. is applied to the one electrode ($\Phi_1$) to oscillate it, the charge of the adjoining picture element is unaffected thereby. This is because the barrier electrode ($\Phi_4$) of the adjoining picture element is set adjacent to the electrode ($\Phi_1$) supplied with the aforesaid bias a.c.

When the bias a.c. is supplied to one of the electrodes to suppress the blooming produced in the vertical transfer line only while the shutter is opened to expose the element, the element is subsequently placed in the transfer mode and the transfer electrodes $\Phi_1$-$\Phi_4$ are driven by the clock input.

As a means for suppressing the blooming in the photoelectric means, a VOD or LOD may be used.

In the blooming suppressing method according to this embodiment, the blooming produced on the vertical transfer line which the solid pickup element employs as a photosensitive block can be suppressed. Moreover, the method according to the present invention, which is different from that of providing the LOD along the vertical transfer line, for instance, ensures improvement in the blooming properties without reducing the aperture ratio.

Figure 23:
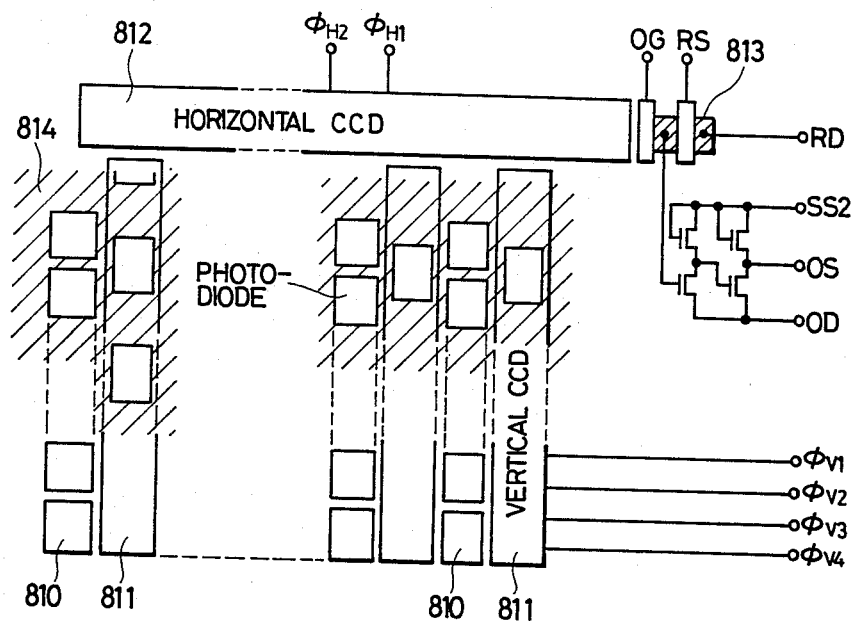
FIG. 23 is a structural view of a solid pickup apparatus illustrating a tenth embodiment of the present invention.

FIG. 23 shows a tenth embodiment of the present invention, wherein a solid pickup apparatus employs an interline transfer CCD as a vertical transfer line for photoelectric conversion. More specifically, the aforesaid image sensor comprises photoelectric conversion means consisting of a plurality of photodiodes 810 arranged in the form of a matrix, vertical transfer lines arranged vertically along a row of the photodiodes 810, a horizontal CCD 812 at the output terminal of each vertical transfer line, and an output circuit 813. The vertical transfer line 811 formed with the vertical CCD is covered with the same microfilter as what is used for the photodiode block.

The microfilter is not shown for the sake of illustrative brevity.

The vertical transfer line 811 is such that, at the time of exposure, one picture element is formed with four polysilicone transfer electrodes vertically adjacent to each other and horizontally partitioned by transfer gates 804, each being arranged between a channel stopper 803 and the photoelectric conversion means, and further vertically partitioned by the potential barriers beneath both the two electrodes ($\Phi v_1,\Phi v_4$) supplied with a low level voltage. Moreover, potential wells are provided beneath the central two electrodes ($\Phi v_2,\Phi v_3$) supplied with a high level voltage for the purpose of charge storage.

The effective photosensitive block of the vertical transfer line 811 thus arranged is so defined that it is saturated with the same quantity of light as that of the photodiode 810.

Figure 24:
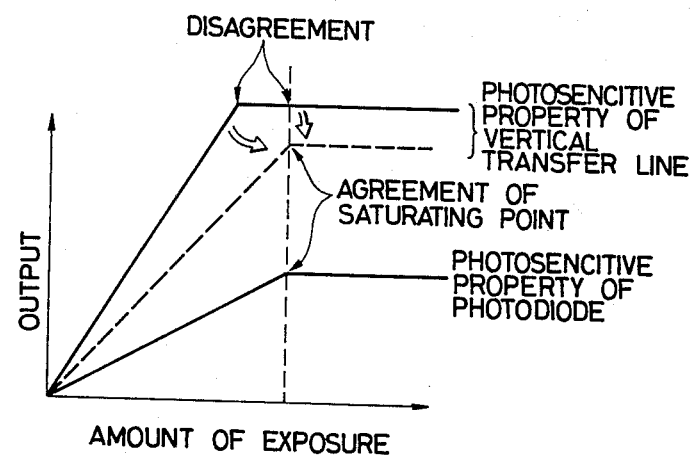
FIG. 24 is a graph showing photosensitive characteristics of vertical transfer lines and photodiodes of a solid pickup apparatus employing the vertical transfer line as a photoelectric conversion means.

As shown in FIG. 24, the photosensitive properties of the photodiode 810 and the vertical transfer line are different and the vertical transfer line is saturated with the quantity of exposure smaller than what is applied to the photodiode. As is obvious from the drawing, the saturation point of the vertical transfer line 811 can be made coincident with that of the photodiode 810 provided the photosensitive face of the vertical transfer line is set narrower.

Consequently, there is provided a shading means 814 on the element to clarify the area ratio of the effective photosensitive block of the vertical transfer line and the aperture of the photodiode 810.

An aluminum film is employed as the shading means 814 and arranged in position between the element face where the vertical transfer line 811 and the photodiode 810 are formed and the color filter.

The shading portion of the shading means 814 is naturally determined in consideration of the photoabsorption ratio of the polysilicone electrodes ($\Phi v_1$-$\Phi v_4$) and the color filter and the vertical effective photosensitive block of one photosensitive element is clearly defined to prevent charges from being generated beneath the outer barrier electrodes of the aforesaid four polysilicone electrodes on the vertical transfer line.

As the aforesaid shading means 814, a light reflecting or light impermeable meaterial can be disposed and as the light reflecting material, the aforesaid aluminum and metal such as chrome may be deposited in the form of a layer or use can be made of polyimide mixed with barium sulfate or titanium dioxide, lithopone, mica, $Al_2O_3$, MgO, ZnO and polyimide containing diamond. Moreover, as the light reflecting material, polyimide containing organic or inorganic colored pigments.

In the aforesaid embodiment, although a description has been given of the shading means disposed between the element face and the color filter, that means maybe provided on the color filter.

In general, photoelectric conversion is carried out even beneath the barrier electrodes ($\Phi v_1,\Phi v_4$) on the vertical transfer line and the charges thus generated are moved to the underside of the central electrodes ($\Phi v_2,\Phi v_3$) supplied with the high level voltage and stored therein. Accordingly, because it practically functions as though the photosensitive block were expanded, saturation is accelerated and completed with the quantity of exposure different and smaller than what is applicable to the photodiode. The difference in the photosensitive efficiency between the vertical transfer line and the photodiode causes the deterioration of the color balance, particularly the color balance in the highlight portion. However, the area ratio of the photosensitive face of the photoelectric conversion means to that of the vertical transfer line is clearly defined in this embodiment and set in such a manner as to make both the saturation points coincident with each other, so that the white color balance of the highlight portion close to the saturation point is particularly ensured with excellent color reproducibility.

In the aforesaid embodiments as shown in FIGS. 1-24, the structure and function of the photosensitive means and the charge storage portion of the solid pickup apparatus have been described in detail. Subsequently, a description will be given of the method of reading output signals from the solid pickup element, recording the data thus read out and applying the present invention to an electronic still camera.

Figure 25:
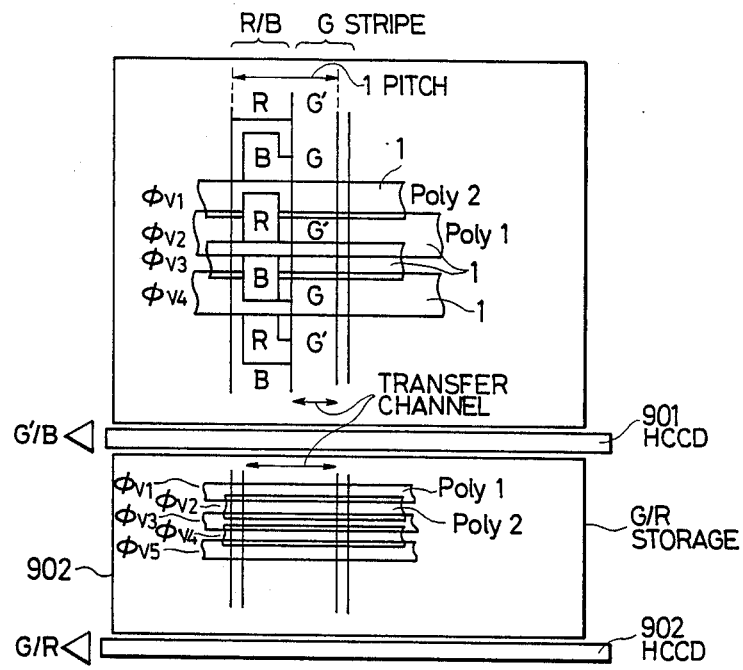
FIG. 25 is a schematic diagram of an eleventh embodiment of the present invention relating to reading, and recording method.

FIGS. 25 through 27 shows an eleventh embodiment of present invention illustrating the method of reading output signals from the solid pickup element and recording the data thus read out.

FIG. 25 is a schematic view showing the construction of the solid pickup apparatus for implementing the method embodying the present invention. In FIG. 25, there are shown the photoelectric conversion elements R, B and the vertical charge transfer means G in the upper portion. The reference characters represent the permeable light colors of the microcolor filters arranged on the element and each element is allotted to the color designated by the symbol R, B or G. Although not shown in detail, switches are installed between the photoelectric elements R, B and the vertical charge transfer element G. Transparent electrodes 901 for controlling the transfer of the charges are horizontally installed above the elements and the four electrodes 901 are vertically formed into a group and controlled by a four-phase clock signal. One group of electrodes forms a vertical charge transfer element G and, as is obvious from the drawing, the one vertical transfer element G belongs to the two photoelectric conversion elements R, B.

According to the present embodiment, the vertical transfer element G simultaneously functions as the photoelectric conversion element G. Consequently, if the image sensor is operated by the conventional method to read out signals, the signals G respectively corresponding to the signals R, B are read out. Since the signal charge produced in the vertical transfer means G during the exposure is transferred to the storage portion 902 at high speed, a signal G' is formed in the vertical transfer means G after the preceding transfer and the same effect of providing an equivalent double photoelectric conversion element can be obtained.

When the signal is read out, the signal charge within the vertical charge transfer means is read out through the first horizontal charge transfer means HCCD 901 and the signal charge within the storage portion is read out through the second horizontal charge transfer means HCCD 902.

FIGS. 26, 27 show examples of post processing of the signals read out by the image sensor according to the present embodiment. The signals thus read out are designed to be recorded on magnetic disks.

Figures 26A, 26B:
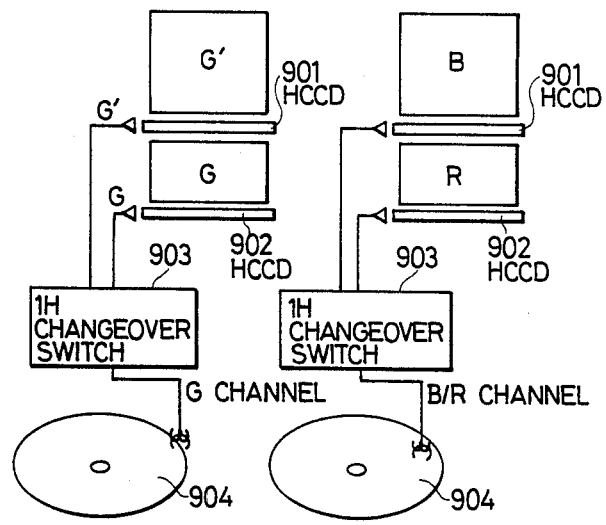

FIG. 26(a) shows the operation of reading the signal G' from the first horizontal charge transfer means HCCD 901 and the signal G from the second horizontal charge transfer HCCD 902. In this case, a changeover switch 903 is switched in such a manner that, after it allows the signal G' to be read out over one horizontal linear period, it causes the signal G to be read out over the following one horizontal line period. The signals G', G thus read out are recorded in the channel G of the magnetic disk 4.

FIG. 26(b) shows the operation of reading the signal B from the first horizontal charge transfer means HCCD 901 and the signal R from the second charge transfer means 902. In the same manner as described above, the changeover switch 903 is switched so that, after it allows the signal B equivalent to one horizontal line to be read out, it causes the signal R equivalent to one horizontal line to be read out. The signals B, R thus read out are recorded in the B/R channels of the magnetic disk 4.

Figure 26C:
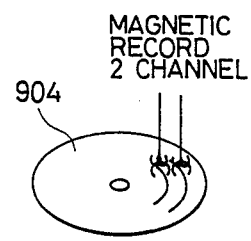

FIG. 26(c) shows a schematic view of a magnetic disk apparatus for use in recording signals. The magnetic disk apparatus has two magnetic heads for two channels.

FIG. 27 shows a changeover switch 905 for switching the channels. FIG. 27 also shows a schematic arrangement of the tracks G, B/R thus recorded. As the tracks G, B/R are arranged in parallel, if the two magnetic heads are used to read signals from the two tracks, the signals G, B or G' and R can simultaneously be obtained. Accordingly, if the signal in the B/R channel is delayed for one horizontal line period, the signals G, B, R can simultaneously be obtained. Ordinary signals Y, R−Y and B−Y are thereby formed.

According to the present embodiment, the number of picture elements having the signal G as the main component of luminance can be maximized. The signal G can be recorded on a one channel one track basis and the signals R/B when they are read out, luminance and color difference signals are simply obtainable. Images ensuring extremely high resolution in view of sensibility can thereby be offered.

Figure 28:
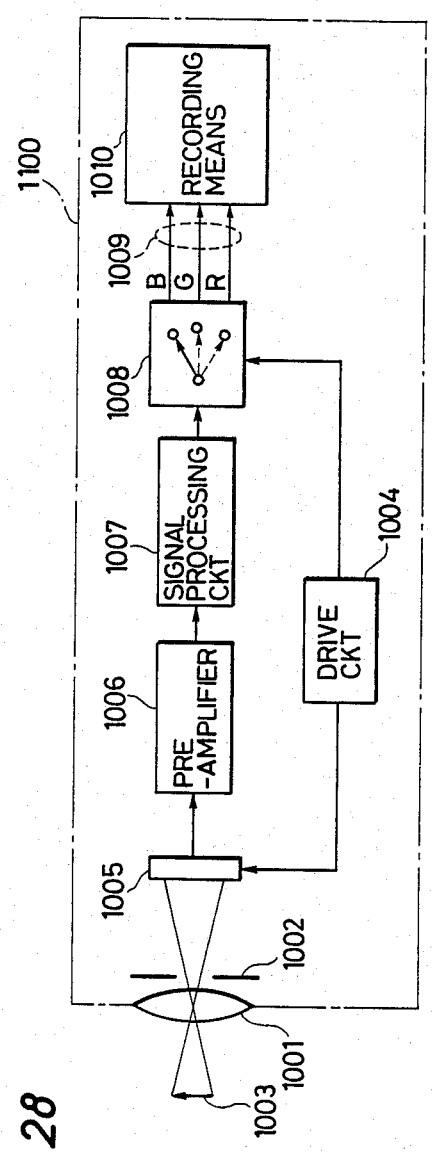
FIG. 28 is a system chart illustrating the image recording system of an electronic still camera as a twelfth embodiment of the present invention.

FIG. 28 is a system chart illustrating the image recording system of an electronic camera to which a solid pickup apparatus, as an twelfth embodiment of the present invention, is applied.

More specifically, the aforesaid electronic still camera, like a conventional silver salt film, camera, is equipped with an image forming optical system 1001 and a shutter 1002 in dark box 1100. An image of an object 1003 introduced through the image forming optical system 1001 and the shutter 1002 is picked up by a solid pickup element 1005 controlled by a drive circuit 1004 and produced as a photoelectrically converted image signal. This signal is subjected to color separation by the three primary colors B, G, R and photoelectrically converted images are sequentially produced on a face basis. Further, the image signal is amplified and processed through a preamplifier 1006 and a signal processing circuit 1007 before being portioned out according to the colors by a face sequence switching means 1008 controlled by the drive circuit 1004. The signals thus distributed among the colors are sequentially respectively supplied to output lines 1009 and recorded on various recording means 1010 as described later.

Figure 29:
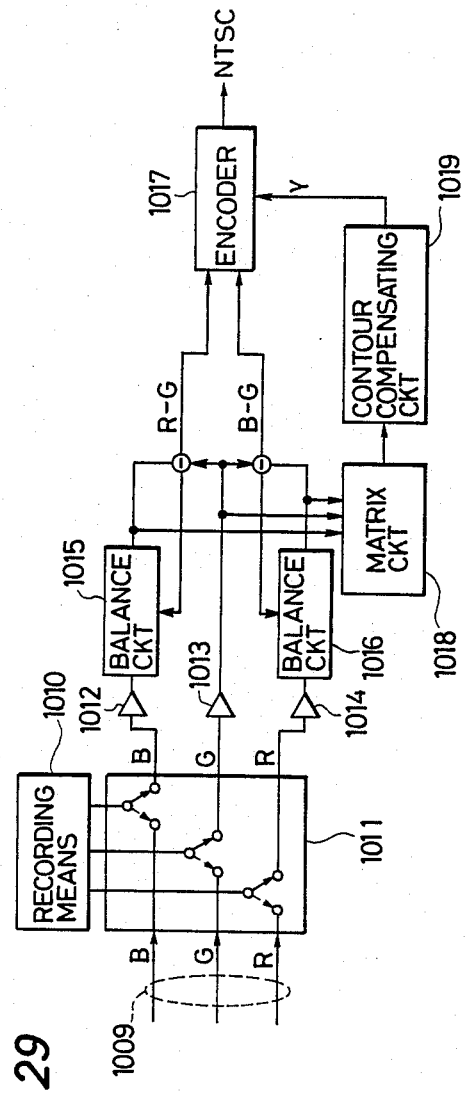
FIG. 29 is a system chart illustrating the image playback system of FIG. 28.

FIG. 29 shows a playback system, wherein the image signals recorded on the aforesaid recording means 1010 in the face sequence by the three primary colors B, G, R are simultaneously produced by switching a recording-playback mode changeover switch 1011. That is, the color signals produced by the recording means 1010 are respectively supplied to preamplifiers 1012, 1013, 1014 through the mode changeover switch 1011 and the colors B/R signals re supplied to white balance circuits 1015, 1016. With the color G signal as a standard, operational process is performed between the color signals B/R passed through the white circuits 1015, 1016 and the color G signal to form color difference signals R−G, B−G. The color difference signals R−G, B−G are supplied to an encoder 1017 and fed back to the white balance circuits 1015, 1016 for white balance correction. The colors B/R passed through the white balance circuit 1015, 1016 and the color G are respectively supplied to a matrix circuit 1018. The output color B, G, R signals supplied by the matrix circuit 1018 are added up in the contour compensating circuit 1019 and synthesized with a luminance signal Y. Then the signal thus combined is added to the encoder 1017 and mixed with the color difference signals R−G, B−G and regenerated in the form of an NTSC system color image signal.

Figure 30:
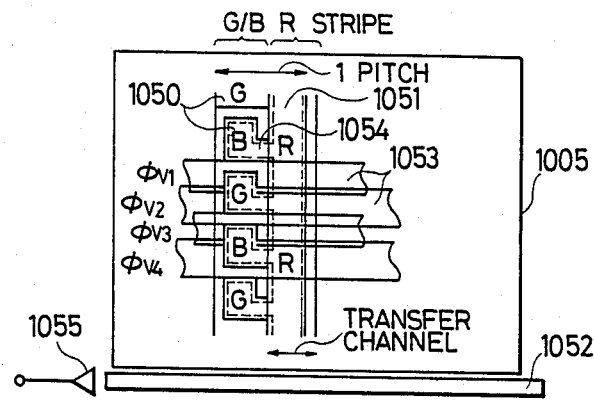
FIG. 30 is a structural view of a solid pickup element suitably applicable to the present invention.

FIG. 30 is a concrete example of a solid pickup element fit in the electronic still camera thus constructed.

The solid pickup element 1005 for use is arranged so that the vertical transfer channel of the conventional interline transfer type element is covered with a microcolor film to utilize this block as a photoelectric conversion means.

In FIG. 30, the solid pickup element 1005 comprises photoelectric conversion elements 1050 arranged in the form of a matrix, a vertical transfer CCD 1051 arranged in parallel to each row of the photoelectric conversion elements 1050 and a horizontal CCD 1052 arranged horizontally along the output terminals of the vertical transfer CCDs. The vertical transfer CCD 1051 functions as a photoelectric converter and simultaneously a charge transferer. Consequently, the surface of the vertical transfer CCD 1051, like that of the photoelectric conversion element, is covered with the microcolor filter through a polysilicone transparent electrode 1053 for transferring charges. The microcolor filter has three colors B, G, R and the arrangement of the colors is such that the colors G and B corresponding to the photoelectric element surface are alternately vertically disposed. On the other hand, the color R whose light is less absorbed by the polysilicon electrode is arranged in the form of stripes on the vertical transfer CCD 1051. The concept of the color arrangement is indicated by reference symbols B, G, R. A transfer gate 1054 is installed between each photoelectric conversion element 1050 and the vertical transfer CCD 1051 and used to control the field-to-field shifting of the colors G/B to the vertical transfer channel.

Figure 31:
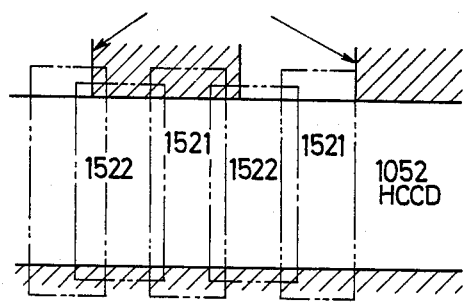
FIG. 31 is an enlarged view illustrating the horizontal CCD of the above solid pickup element.

Moreover, the horizontal CCD 1052 whose enlarged version is shown in FIG. 31 sequentially transfers signal charges amounting to one line and transferred from the vertical transfer CCD 1051 to a buffer amplifier 1055 by applying predetermined drive signals, e.g., two phase drive signals $\Phi h_1$, $\Phi h_2$ to transfer electrodes 1521, 1522 disposed in parallel.

The solid pickup element 1005 thus constructed is capable of image signals of three colors B, G, R in face sequence, i.e., of the color B, G, R signal charges stored in the solid pickup element, the color R charges generated in the vertical transfer CCD 1051 are first read from the horizontal CCD 1052 during the signal transfer period. During this period, the color G/B color charges remain in the photoelectric conversion elements. After all the color R signal charges are read from the horizontal CCD 1052, the transfer gate 1054 is subsequently opened to field-to-field shift the color G or B to the vertical transfer CCD 1051. Then the color G or B, like the color R, is transferred to the horizontal CCD 1052 and sequentially read out. Finally, the remaining color B or G is likewise read out from the horizontal CCD 1052 and sent out in face sequence.

Figure 32:
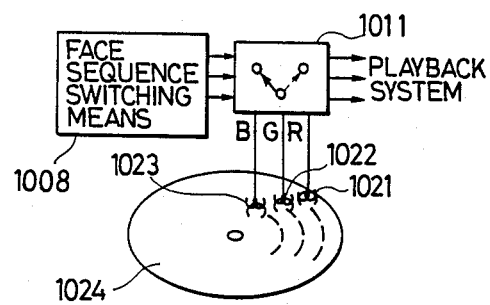
FIG. 32 is a recording means embodying the present invention.
Figure 33:
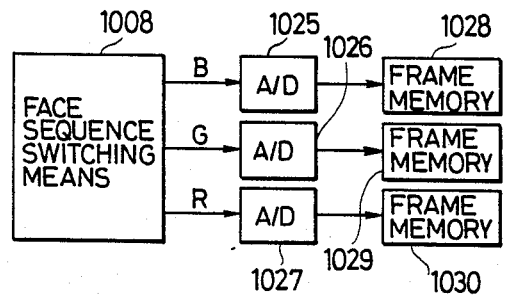
FIG. 33 is another recording means embodying the present invention.

FIGS. 32, 33 show recording means 1010 for recording the image signals produced by the solid pickup element in face sequence.

FIG. 32 shows a case where image signals are recorded on a magnetic disk using three magnetic heads.

More specifically, the colors B, G, R sent out of the solid pickup element and distributed among the respective output lines 1009 by the face sequential switching means 1008 are supplied to the magnetic heads 1021, 1022, 1023 through the mode changeover switch 1011. The magnetic heads 1021, 1022, 1023 consist of three magnetic heads respectively corresponding to the colors B, G, R and each magnetic head is so arranged as to correspond to one track of the magnetic disk 1024, so that a field image equivalent to one color can be recorded on one track. The magnetic heads 1021, 1022, 1023 are caused to function as a playback by switching the mode changeover switch 1011 to replay the three tracks simultaneously. Each color image signal being played back simultaneously with the three tracks is played back as an NTSC system color image signal through the playback system shown in FIG. 29.

FIG. 33 shows a case where three frame memories are the recording means 1010.

More specifically, the signals distributed among the colors B, G, R by the face sequential switching means 1008 like what is shown in FIG. 32 are respectively converted into digital signals through an A/D converters 1025, 1026, 1027 and then individually recorded on the frame memories 1028, 1029, 1030 composed of RAMs having a memory capacity of 500 KB. The digital signals are taken out of the frame memories and supplied to the playback system of FIG. 29. However, the signals are converted into original analog signals through a D/A converter (not shown) first and supplied to the color B, G, R playback system.

Figure 34:
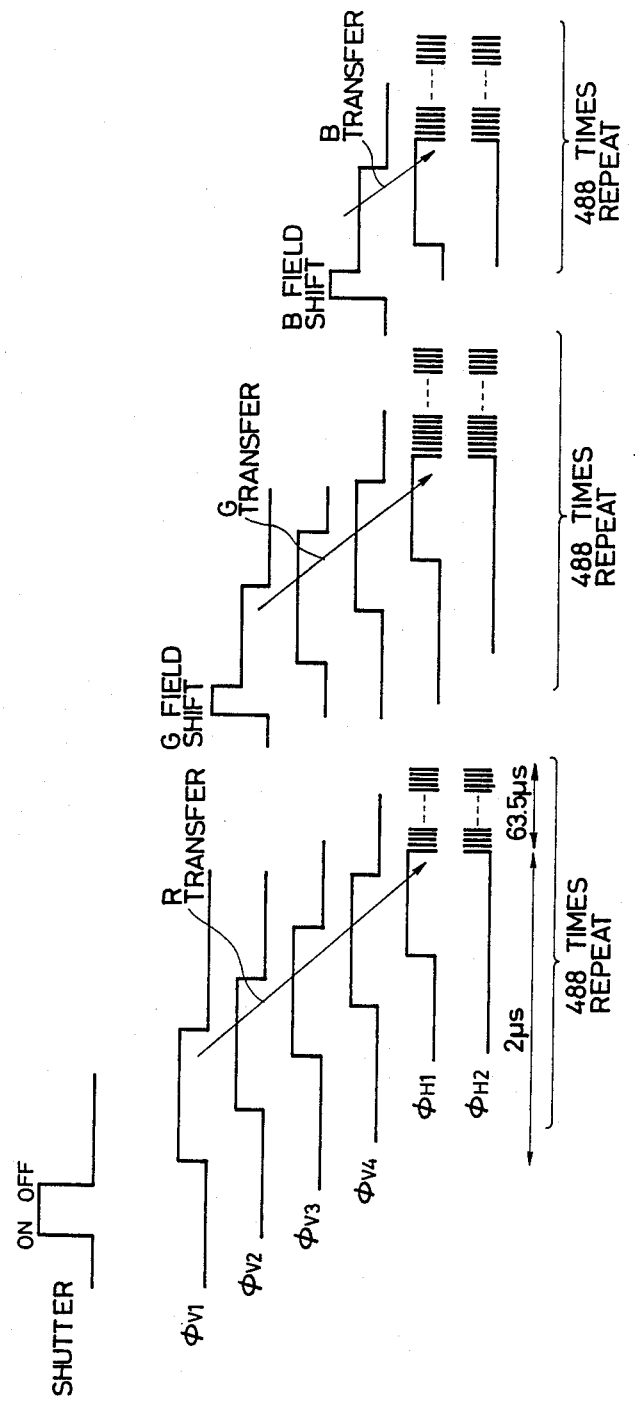
FIG. 34 is a recording timing chart deriving from the electronic still camera embodying the present invention.

Referring to recording timing of FIG. 34, a description will be given of the recording and playback process performed by the electronic still camera thus arranged.

As the recording means, reference is made to recording using the magnetic disk of FIG. 32 having three channel magnetic heads.

When an object is picked up through the switching operation of the shutter 1002, the color R charges in the vertical transfer CCD 1051 out of the signal charges stored in the solid pickup element 1005 are first vertically transferred in parallel as signals equivalent to one scanning line by the four-phase drive $\Phi v_1$–$\Phi v_4$ at a standard television scanning speed and further sent out from the horizontal CCD 1052 and then recorded on the first track of the magnetic disk. This process is repeated 488 times based on the vertical number of picture elements of the solid pickup element, whereby color R field images are recorded on one track. Subsequently, the color G is field-to-field shifted to the vertical transfer CCD 1051 and sent out from the horizontal CCD 1052 and then recorded on the second track. The color B is lastly field-to-field shifted to the vertical transfer CCD 1051 before being recorded on the third track of the magnetic disk. With respect to playback, the three tracks stored with the color data are simultaneously replayed by switching the mode changeover switch 1011 to obtain the colors R, G, B. The colors R, G, B being taken out are synthesized by a playback circuit and observed as a static color image by means of a television.

In the aforesaid embodiment, although a description has been given of recording data on the magnetic disk using the three channel magnetic heads on a track basis, it may also be arranged to allow one magnetic head to scan tracks on a color basis. Even in this case, however, three magnetic heads must be used for simultaneous playback.

As set forth above, since the electronic still camera according to the present invention employs one solid pickup element capable of producing the three colors in face sequence, no color separation circuit nor a 1×H delay circuit can be dispensed with and consequently the still camera is made compact and simple in construction as a whole. Moreover, by recording the three colors using the three tracks and simultaneously playing back them with the three channel heads, it becomes possible to theoretically obtain very true color images similar to those obtained under the three plate type pickup system. Moreover, the use of the interline type solid pickup element as specified in the aforesaid embodiments of the present invention and of the vertical transfer channel as a light receiving zone makes it possible to improve blue color sensitivity and increase the aperture ratio, so that the whole sensitivity becomes improvable. In addition, the number of horizontal picture increases 1.5 times, whereby images offering excellent resolution are available.

The color image signal recorded on the aforesaid magnetic disk is not conformable to the standard of the FM recorded color difference and luminance signals by means of the electronic still camera and consequently not compatible with the latter.

In view of this, a further description will be given of a still image recording system embodying the present invention, wherein an object picked up by a solid pickup element capable of producing R, G, B image signals in face sequence can be recorded on a magnetic disk using standard signals from an electronic still camera.

Figure 35:
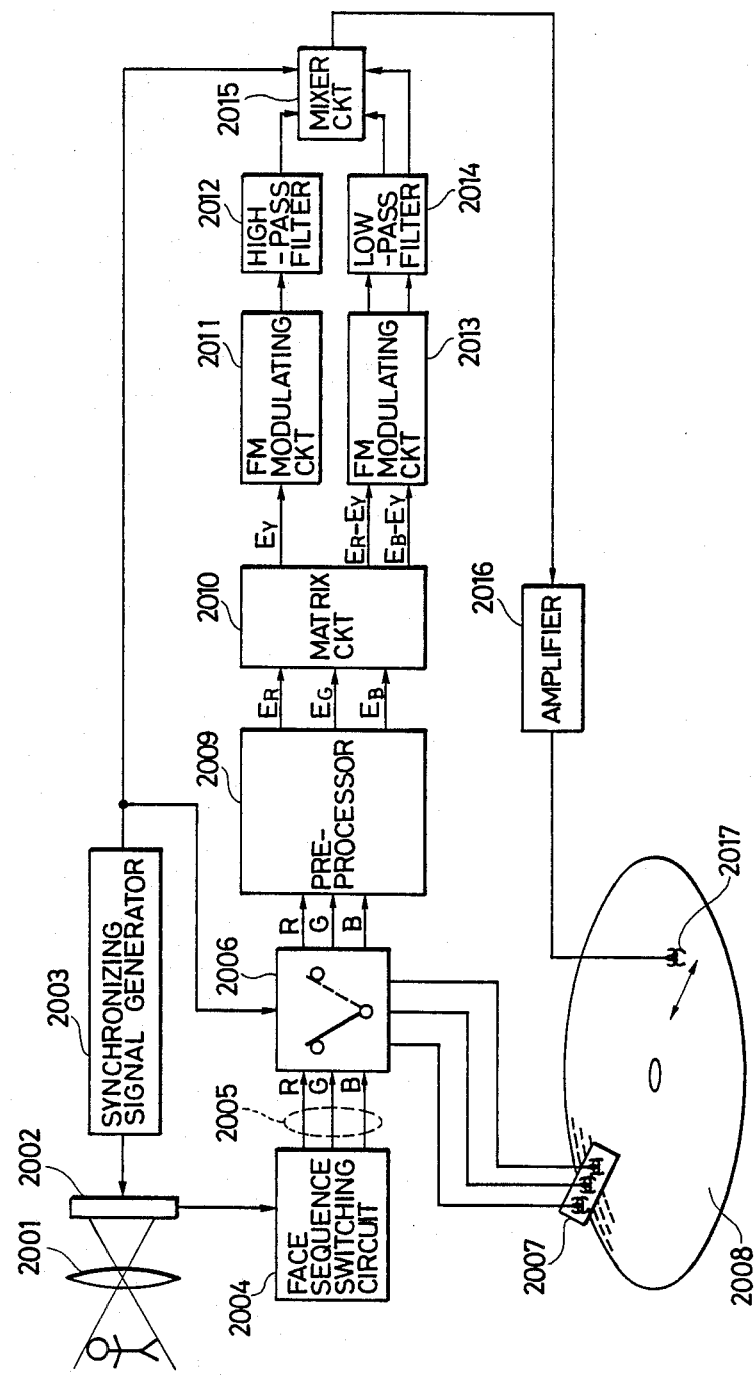
FIG. 35 is a structural view of an electronic still camera to which a thirteenth embodiment of the present invention applies.

FIG. 35 shows the concept of an electronic still camera embodying the present invention.

In this embodiment, the solid pickup element described in the twelfth embodiment, i.e., the element producing R, G, B color signals in face sequence, is employed as a pickup means for the electronic still camera.

The pickup face of the solid pickup element 2002 with the object image passed through an optical system and formed thereon is scanned in accordance with horizontal and vertical synchronizing signals from a synchronizing signal generator 2003 and image signals derived from the three primary color separation are generated in face sequence. The image signals thus produced in face sequence are supplied to a face sequence switching circuit 2004, in which they are distributed among output lines 2005 by colors R, G, B, before being supplied to three channel magnetic heads 2007 corresponding to the output lines through a mode changeover switch 2006.

The three channel magnetic heads 2007 are fixed magnetic heads fixed onto three tracks on the outer peripheral side of a magnetic disk 2008. Accordingly, the color R, G, B images constituting a static image produced by the solid pickup element 2002 in face sequence are recorded by the three channel heads 2007 on the three tracks, respectively.

When the images of the static image whose colors have thus been separated are recorded on the respective three tracks, the aforesaid mode changeover switch 2006 is subsequently switched and the three channel magnetic heads 2007 are used as a playback head to replay the three tracks.

A preprocessor 2009 is supplied with the simultaneously regenerated primary color signals R, G, B, which are amplified up to a processable signal level and subjected to gamma correction, insertion of pedestals and blanking pulses and white level clipping, and outputs the thus processed primary color signals $E_R$, $E_G$, $E_B$.

A matrix circuit 2010 performs operations based on the primary color signals $E_R$, $E_G$, $E_B$ supplied by the preprocessor 2009 and produces a luminance signal $E_Y$ and color difference signals $E_R-E_Y$, $E_B-E_Y$.

A first FM modulating circuit 2011 converts the luminance signal $E_Y$ into what has a first FM wave within a particular frequency range and sends the luminance signal thus modulated to a high-pass filter 2012.

A second FM modulating circuit 2013 converts the color difference signals $E_R-E_Y$ and $E_B-E_Y$ into what has a second FM wave within a frequency range different from that of the first FM wave and sends the color difference signals thus modulated to a low-pass filter 2014.

The luminance signal $E_Y$ and the color difference signals $E_R-E_Y$, $E_B-E_Y$ respectively passed through the high- and low-pass filters 2012, 2014 are supplied to a mixer circuit 2015 and a mixed signal is produced thereby as a recording signal.

The recording signal is supplied to a moving magnetic head 2017 through an amplifier 2016 and the signal equivalent to one field are again recorded on one track in the standard recording area of the magnetic disk 2008 as a standard signal, whereby one sheet of static color image is recorded on one track.

Tracks in areas other than the standard recording ones are repeatedly used as a buffer track and each image signal produced by the element is repeatedly recorded. The standardized signal is sequentilly recorded on each track in the standard recording area.

With respect to the field recording in the aforesaid embodiment, the resolution of the regenerated image is inferior to that in frame recording for obtaining a one frame static image with two fields. In order to obtain image quality as high as that in the case of the NTSC signal, one frame image can be recorded and played back with one disk turn using two channel magnetic heads.

In other words, a field frame conversion circuit for providing signal conversion using a commonly known 0.5 H delay line is inserted in the rear stage of the solid pickup element and the one frame signal thus produced is recorded by two channel magnetic heads on two tracks and played back henceforth.

As set forth above, the static image recording method in the aforesaid embodiment makes it unnecessary to convert normally considered face sequential signals into digital signals, store them in a memory and simultaneously change them into a signal again to obtain a standard signal by recording the face sequentially produced R, G, B color signals on the tracks in the area other than the standard recording area of the magnetic disk and taking out the R, G, B signals thus recorded as a simultaneous signal. In consequence, all the signals can be treated as an analog signal and this makes the circuit arrangement simple. Moreover, the simplified circuit arrangement avoids a drastic increase in power consumption resulting from the installation of a digital conversion circuit and a frame memory, and production costs.

In addition, the solid pickup element capable of producing face sequential signals is usable for picking up objects and recording them, so that images with high resolution equivalent to that in the case of the three plate type are recorded.

FIG. 36 shows still another electronic still camera embodying the present invention, wherein luminance and color difference signals in accordance with the standard video floppy standard can be recorded on magnetic disks.

FIG. 36 shows the concept of an electronic still camera applicable to the present invention.

In FIG. 36 the electronic still camera has a self-contained image formation optical system 3021 and a self-contained shutter in its dark box 3020 as in the case of the conventional silver salt film camera. An image incident through the image formation optical system 3021 and the shutter 3022 is picked up by a solid pickup element 3024 controlled by a drive IC and produced as a photoelectrically converted image signal.

The solid pickup element 3024 is the same in construction as those previously described. More specifically, a microcolor filter is arranged on the vertical transfer channel and image signals equivalent to the three primary color components subjected to color separation are sent out of one horizontal CCD in face sequence.

Of the image signals face sequentially produced, a first color signal is supplied to a sample hold circuit 3025 and an A/D conversion circuit 3026 for digital conversion and stored in a frame memory 3027 capable of storing three field signals.

Subsequently, a second color (G or B) signal produced by the solid pickup element 3024 is similarly subjected to digital conversion and stored in the frame memory 3027, whereas a third color (B or G) signal undergoes digital conversion and is stored in the frame memory 3027. The signals sequentially stored in the frame memory 3027 are simultaneously converted into a signal and taken out and then supplied to a D/A conversion circuit 3028. The D/A conversion circuit 3028 acts in such a manner as to convert the three field signals simultaneously in an analog form and supply them to a RGB processing circuit 3029. The RGB processing circuit 3029 amplifies the signals thus simultaneously generated and subjects them to various signal processing and, by mixing a synchronizing signal with the aforesaid signals to reform them into the luminance signal Y and the color difference signals R−Y, B−Y outputs the luminance and color difference signals to a video floppy 3031 for magnetic recording.

The luminance signal Y and the color difference signals R−Y, B−Y recorded on the video floppy are regenerated by switching a image recording playback changeover switch 3030. Further, the luminance signal and the color difference signals thus regenerated are supplied to a color encoder 3033 and formed into an NTSC system type composite color image signal.

The solid pickup element 3024 and each signal processing circuit are controlled by the synchronizing signal from a synchronizing signal generator 3032.

FIG. 37 shows an example wherein, in reference to the embodiment shown in FIG. 36, R, B and G signals subjected to FM by supplying the output of the D/A conversion circuit 3028 to the RGB modulation circuit 3034 are directly recorded on respective tracks of a video floppy 3036 using three channel heads 3035. In the case of the aforesaid arrangement, the signals recorded on the magnetic disk are those based on the NTSC system and the images must be played back simultaneously from the three tracks by means of the three channel heads.

As described above, the picked up image signal of the object is magnetically recorded as a standard video floppy standard signal in the electronic still camera according to the present invention and therefore the electronic still camera has compatibility with equipment prepared after other standards and is thus widely usable. Moreover, the use of the solid pickup element capable of producing image signals in face sequence by means of the color filter ensures excellent resolution though the pickup element is of a single plate type and its circuit arrangement can be simplified because the color separation circuit and the 1 H delay circuit for use in the three plate type can be dispensed with.

The electronic still camera constructed according to the aforesaid embodiments of the present invention is designed, like a conventional one, to magnetically record image signals produced by the solid pickup element on the flexible rotating magnetic disk (video floppy) and consequently accompanied by a mechanical drive system.

The presence of the accompanying mechanical drive system a deterrent to making the camera compact and reducing its price. It has been considered impossible to reduce the size of the electronic still camera up to pocket size. Moreover, the mechanical drive system tends to become a trouble source.

In view of the aforesaid fact, an additional embodiment of the present invention is designed to record data on an IC card by employing a solid pickup element capable of producing image signals in face sequence and, after subjecting the image signals picked up by the element to analog/digital conversion, using the IC card incorporating a semiconductor chip as a recording medium.

FIG. 38 shows the concept of an electronic still camera having an IC card incorporating a semiconductor chip as a recording medium.

As shown in FIG. 38, the electronic still camera, like the conventional silver salt film camera, has a self-contained image formation optical system 4021 and a self-contained shutter 4022 in its dark box 4020. An image of an object introduced through the image formation optical system 4021 and the shutter 4022 is picked up by a solid pickup element 4024 controlled by a drive IC 4023 and produced as photoelectrically converted image signals.

The solid pickup element is of the same type as that of those described in the preceding embodiments. That is, the solid pickup element has vertical transfer channel covered with a microcolor filter and sends the three primary color image signals resulting from color separation out of one horizontal CCD in face sequence.

With respect to the image signals produced in face sequence, the first color field signal is supplied to a sample hold circuit 4024 and an A/D conversion circuit 4026 for digital conversion and then stored in a frame memory 4027 capable of containing three field signals. The frame memory 4027 is formed with a RAM having a memory capacity of 500 KB per field. When the second color (G or B) signal is produced by the solid pickup element 4024, this signal is also converted into a digital form and stored in the frame memory 4027. Subsequently, the third color (B or G) signal is changed into a digital form and stored in the frame memory 4027. When the three field signals are stored in the frame memory 4027, the signals are read out at a time and taken out as a simultaneous signal and supplied to a digital signal processor (DSP) 4028. The DSP processes the signal with interpolation and frequency band compression, then provides the signal with a predetermined format and sends it out so that the signal may be recorded on an IC card as described later. The signal thus produced is recorded on the IC card 4030 through a writer.

The solid pickup element 4024 and each signal processor are controlled by a synchronizing signal from a synchronizing signal generator 4032.

The aforesaid writer 4029 comprises an input/output means for mounting, detecting and discharging the IC card, interfaces respective for exchanging signals with the DSP 4028 and the IC card 4030, a CPU for controlling the input/output means and the interfaces, and a power supply, the writer writing the signal from the DSP 4028 through a signal terminal.

The IC card 4030 is roughly as large as a name card and formed by providing a space large enough to contain an IC in polyvinyl chloride as a principal card material base, burying the IC module in the space and sandwiching the base with thin plastic sheets. The IC card is so shaped as to fit into the camera. The IC module is of a two chip construction wherein the combination of a microprocessor and an IC memory chip is normally incorporated in a printed circuit board, In the present invention, however, a one chip memory card with only the memory is satisfactory. The memory chip ma be composed of a static RAM for holding memory with a battery as a power supply, the chip being capable of recording and reading out a given image signal. On the contrary, it may be composed of a PROM which requires no battery as a power supply.

Playback is effected by a CRT or printer mounted in an exclusive reader.

As set forth above, the electronic still camera according to this embodiment can be made compact by employing the IC card as an image signal recording medium while making unnecessary the mechanical drive system in the conventional magnetic recording. Moreover, the percentage of troubles can be minimized because no mechanical drive system exists. The electronic still camera according to the present invention employs the face sequential output type solid pickup element to ensure the acqustion of playback images equivalent to that of the three plate type and at the same time circuit arrangement simplification by converting the image signal thus produced into a digital signal through signal processing and recording the digitized signal.

What is claimed is:

1. A solid image pickup apparatus comprising:
    a photosensitive means comprising photosensitive portion and photosensitive transfer portion for receiving light including image information and generating first signal charges in said photosensitive portion and second signal charges in said photosensitive transfer portion corresponding to said image information, said photosensitive transfer portion transferring said first and second signal charges;
    drive control means for controlling the transference of said first and second signal charges in said photosensitive transfer portion;
    gate means for controlling the flow of said first signal charges of said photosensitive portion to said photosensitive transfer portion under transfer drive control, said gate means arranged between said photosensitive portion and said photosensitive transfer portion; and
    color filters for causing said photosensitive portion and said photosensitive transfer portion to produce at least three primary color or complementary color signal charges, said color filters comprising at least first, second and third color filters.

2. The solid image pickup apparatus as claimed in claim 1, wherein said photosensitive transfer portion is covered with said first color filter for generating first color signal charges among the three primary color or complementary color signal charges, and said photosensitive portion is covered with second and third color filters for generating said second and third color signal charges respectively.

3. The solid image pickup apparatus as claimed in claim 2, wherein said photosensitive portion comprises photosensitive blocks each of which consists of plural light receiving elements vertically arranged and functioning as photoelectric converters, and wherein at least two light receiving elements of each photosensitive block are arranged in a pair, each pair being covered alternately with said second and third color filters along said each photosensitive block.

4. The solid image pickup apparatus as claimed in claim 3, said two light receiving elements of said each pair are respectively assigned to an A-field and a B-field in a scanning operation to carry out Interlace scanning operation.

5. The solid image pickup apparatus as claimed in claim 1, further comprising storage means for temporarily storing only said second signal charges produced in said photosensitive transfer portion, or both of said second signal charges and said first signal charges.

6. The solid image pickup apparatus as claimed in claim 5, further comprising horizontal charge transfer means for outputting, at a predetermined synchronizing timing, the signal charges temporarily stored in said storage means and said first signal charges moved to said photosensitive transfer portion after said second signal charges are transferred to said storage means.

7. The solid image pickup apparatus as claimed in claim 6, wherein said horizontal charge transfer means comprises a first horizontal transfer means for outputting said second and third color signal charges, said first horizontal transfer means arranged between both sides of said photosensitive means and said storage means, and a second horizontal transfer means for outputting said first color signal charges temporarily stored in said storage means, said second horizontal transfer means arranged at the other side of said storage means.

8. The solid image pickup apparatus as claimed in claim 6, wherein a channel length in a transfer direction of said storage means is set shorter than the channel length in the transfer direction of said photosensitive transfer portion and wherein a channel width in the transfer direction of said storage means is set greater than the channel width of said photosensitive transfer portion.

9. The solid image pickup apparatus as claimed in claim 6, wherein said horizontal charge transfer means comprises a horizontal shift register for transferring said first and said second signal charges stored in said storage means to the output side in series and there is provided switching means for switching signals equivalent to the signal charges outputted from said horizontal shift register to plural output terminals.

10. The solid image pickup apparatus as claimed in claim 1, wherein said photosensitive portion is covered with said first color filter for generating first color signal charges among the three primary color or complementary color signal charges and said photosensitive transfer portion is covered with second and third color filters for generating second and third color signal charges respectively, all of said color filters being provided in a stripe arrangement.

11. The solid image pickup apparatus as claimed in claim 10, further comprising charge storage means for temporarily storing said second and third color signal charges, first horizontal transfer means for outputting said first color signal charges transferred to said photosensitive transfer portion, said first horizontal transfer means arranged between an output side of said photosensitive means and an input side of said storage means, and second and third horizontal transfer means for outputting said second and third color signal charges, said second and third horizontal transfer means arranged at an output side of said storage means.

12. The solid image pickup apparatus as claimed in claim 11, wherein said first, second and third color filters comprises blue, red and green color filters respectively.

13. The solid image pickup apparatus as claimed in claim 3, further comprising first storage means for temporarily storing said first color signal charges; second charge storage means for temporarily storing said first, second and third color signal charges; a first horizontal transfer means for outputting said first color signal charges stored in said first storage means, said first horizontal transfer means arranged at an output side of said first storage means; and a second horizontal transfer means for outputting said second and third color signal charges transferred to said photosensitive transfer portion, said second horizontal transfer means arranged between said first and second storage means; said first color signal charges being stored in said first storage means through said second storage means.

14. The solid image pickup apparatus as claimed in claim 2, further comprising first storage means for temporarily storing said first color signal charges; first horizontal transfer means for outputting said first color signal charges stored in said first storage means, said first horizontal transfer means arranged between both sides of said photosensitive portion and said first storage means; second storage means for temporarily storing said second color signal charges transferred to said photosensitive transfer portion, said second storage means arranged opposite to said first storage means; second horizontal means for outputting said second color signal charges stored in said second storage means, said second horizontal means arranged at one side of said second storage means; and third horizontal means for outputting said third color signal charges transferred to said photosensitive transfer portion, said third horizontal transfer mean arranged between the other sides of said photosensitive means and said second storage means.

15. The solid image pickup apparatus as claimed in claim 14, wherein all of said color filters are provided vertically in a stripe arrangement, said first color filter corresponding to a long wavelength light among the three primary colors or complementary colors.

16. The solid image pickup apparatus as claimed in claim 15, wherein said gate means for controlling the transferences of said second and third color signal charges to said photosensitive transfer portion is controlled by different voltages in level from each other.

17. The solid image pickup apparatus as claimed in claim 1, wherein said drive control means comprises polysilicone electrodes.

18. The solid image pickup apparatus as claimed in claim 17, wherein at least a color filter corresponding to a short wavelength light among three primary color or complementary color filters covers said photosensitive portion and wherein the surfaces of picture elements of said photosensitive portion are not covered with said polysilicone electrodes to have completely opened windows.

19. The solid image pickup apparatus as claimed in claim 18, wherein said polysilicone electrodes are Virtual phase charge-coupled device (VPCCD) type electrodes, said VPCCD electrodes being driven by a single-phase.

20. The solid image pickup apparatus as claimed in claim 1, wherein said photosensitive portion is provided with vertical or transverse overflow drains and said photosensitive transfer means is provided with the transverse overflow drains along said photosensitive transfer means through an overflow control gate, thereby to suppress blooming phenomenon in said photosensitive portion and said photosensitive transfer portion.

21. The solid image pickup apparatus as claimed in claim 17, wherein bias alternating current is applied to and superposed on one of two electrodes forming potential barriers in each of four electrodes for transferring signal charges of said polysilicone electrodes, thereby to erase excessive charges produced on said photosensitive transfer portion by means of surface recombination of excessive charges.

22. The solid image pickup apparatus as claimed in claim 1, further comprising shading means for causing said photosensitive portion and said photosensitive transfer portion to be saturated with the same quality of light.

23. The solid image pickup apparatus as claimed in claim 22, wherein said shading means is arranged between said photosensitive means and said color filters.

24. The solid image pickup apparatus as claimed in claim 22, wherein said shading means is arranged on said color filters disposed on the surfaces of said photosensitive means.

25. The solid image pickup apparatus as claimed in claim 23 or 24, wherein said shading means comprises any one of light reflecting material and light impermeable material.

26. The solid image pickup apparatus as claimed in claim 25, wherein said light reflecting material is aluminum.

* * * * *